United States Patent Office 3,177,205
Patented Apr. 6, 1965

3,177,205
19-LOWER-ALKYL-10α-DERIVATIVES OF CORTICAL HORMONES
Albert Bowers, Mexico City, Mexico, assignor to Syntex Corporation, Panama, Panama, a corporation of Panama
No Drawing. Filed Mar. 1, 1963, Ser. No. 262,234
21 Claims. (Cl. 260—239.55)

The present invention relates to novel cyclopentanophenanthrene compounds and to a process for the production thereof.

More particularly the present invention relates to 19-lower-alkyl-10α-derivatives of cortical hormones.

The novel compounds of the present invention are represented by the following formulas:

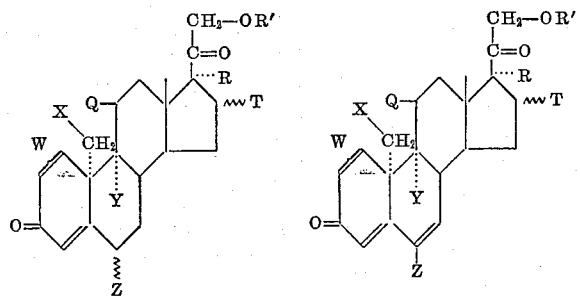

In the above formulas X represents a lower alkyl group; W represents a double bond or a saturated linkage between C-1 and C-2; Z represents hydrogen, methyl, fluorine or chlorine, all having α or β configurations; Q represents a β-hydroxyl or a keto group; Y represents hydrogen, fluorine or chlorine; R represents a hydroxyl group; T represents α-hydrogen, α-acyloxy, α-methyl or β-methyl; T and R together represent the group

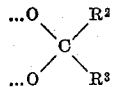

in the 16α, 17α-positions, wherein $R^2$ and $R^3$ each represents hydrogen or a hydrocarbon residue of up to 8 carbon atoms of straight, branched, saturated or unsaturated, cyclic or mixed aliphatic cyclic chain, or aromatic, such as methyl, ethyl, isopropyl, phenyl, toluyl, methyl-cyclohexyl and the like; $R^1$ represents hydrogen or a hydrocarbon carboxylic acyl group of less than 12 carbon atoms.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, phenoxyacetate, cyclopentylpropionate, aminoacetate, and β-chloropropionate.

The compounds represented by the above formulas are valuable cortical hormones with high anti-inflammatory, low catabolic, glycogenic and thymolytic activities. In addition, they are anti-androgenic, anti-gonadotrophic and anti-estrogenic hormones. Furthermore, they have high topical activity in skin disorders, such as psoriasis, allergic dermatitis and the like.

The novel compounds of the present invention are prepared by the process illustrated by the following formula scheme:

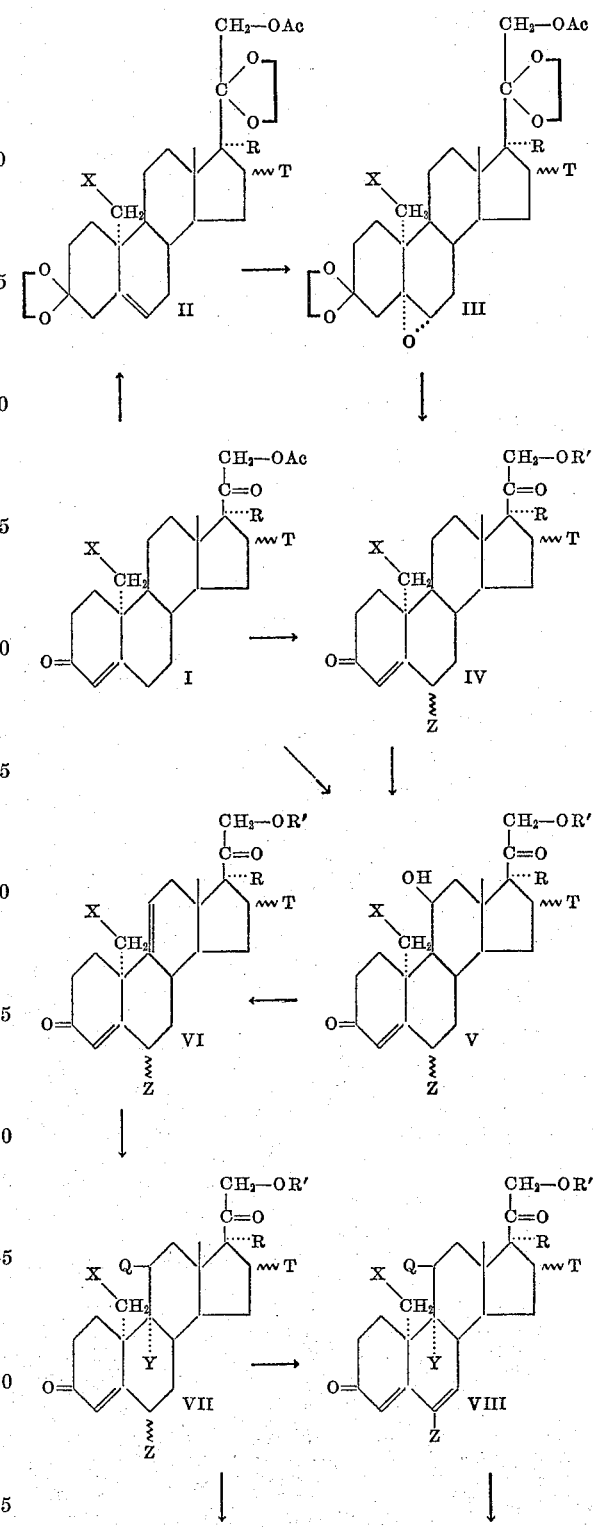

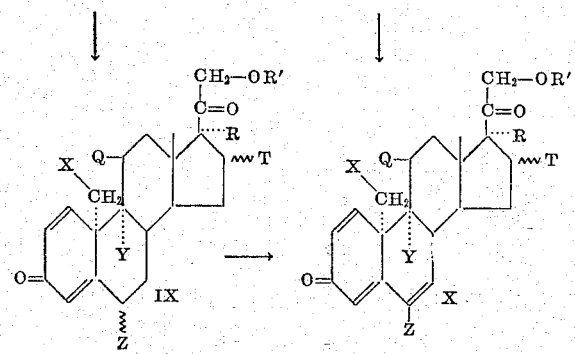

In the above formulas Q, X, Y, Z, R, $R^1$ and T have the same meaning as described hereinbefore.

In practicing the process outlined above, a 19-lower alkyl - $\Delta^4$-10α-pregnen-17α-ol-3,20-dione derivative obtained in accordance with my copending U.S. patent application Serial No. 262,236, filed March 1, 1963, from the corresponding $\Delta^4$-10α-pregnene-17α,19-diol-3,20-dione by protecting conventionally the keto groups in the form of ketals, oxidizing the 19-hydroxy with chromium trioxide in pyridine to the 19-aldehyde, treating the latter with a lower alkyl magnesium bromide, oxidizing the obtained 19-lower alkyl 19-hydroxy steroid with chromium trioxide, subjecting the produced 19-lower alkyl-19-keto compound to the Wolff-Kishner reaction, and finally hydrolyzing conventionally the ketal groups, is treated with iodine in the presence of calcium oxide to give the corresponding 21-iodo derivative, which upon treatment with potassium acetate in a suitable solvent, such as acetone, preferably at reflux temperature, affords the corresponding 21-acetoxy-19-lower alkyl-$\Delta^4$-10α-pregnene-17α-ol-3,20-dione derivative (I). The latter 3,20-dione, upon reaction with ethyleneglycol in the presence of p-toluenesulfonic acid yields the corresponding 3,20-bis-cycloethylenedioxy-19-lower-alkyl-$\Delta^5$-10α-pregnene 17α,21-diol 21-acetate compound (II), which is treated with an organic peracid, such as monoperphthalic acid, in an inert solvent, preferably chloroform, to produce the corresponding 3,20-bis-cycloethylenedioxy-5α, 6α-oxido-19-lower alkyl-10α-pregnene-17α,21-diol 21-acetate (III).

Upon reaction of the latter 3,20-bis-cycloethylenedioxy-5α,6α-oxido compound with methyl magnesium bromide in an inert solvent such as ether or tetrahydrofuran, followed by conventional working up and treatment of the residue with a mineral acid, such as 8% sulfuric acid, and thereafter with thionyl chloride in pyridine at about —10° C., for approximately 4 minutes, there is obtained the corresponding 19-lower alkyl-6β-methyl-$\Delta^4$-10α-pregnene-17α,21-diol-3,20-dione (IV: Z=β-methyl; $R^1$=H). The latter 6β-methyl derivative is treated with an alkali metal hydroxide, such as sodium hydroxide, in a suitable solvent, such as methanol, thus affording the corresponding 6α-methyl derivative (IV: Z=α-methyl; $R^1$=H).

When treating the 3,20-bis-cycloethylenedioxy-5α,6α-oxido compounds (III) with hydrogen chloride, in a suitable organic solvent, such as ethyl acetate, there are produced the corresponding 6α-chloro-19-lower alkyl-$\Delta^4$-10α-pregnene-17α,21 - diol - 3,20 - dione 21-acetate derivatives (IV: Z=α-chlorine; $R^1$=acetyl).

Upon reaction of the 3,20-bis-cycloethylenedioxy-5α,6α-oxido compounds (IV) with anhydrous hydrogen fluoride, preferably in the presence of boron trifluoride etherate, followed by treatment with hydrogen chloride, there are produced the corresponding 6α-fluoro-19-lower alkyl-$\Delta^4$-10α-pregnene-17α,21-diol-3,20-dione 21-acetate derivatives (IV: Z=α-fluorine; $R^1$=acetyl).

The 21-acetoxy-19-lower alkyl-$\Delta^4$-10α-pregnen-17α-ol-3,20-dione-derivatives (I) are treated with ethyl orthoformate in the presence of p-toluenesulfonic acid, in an inert solvent, thus affording the corresponding 21-acetoxy-19-lower alkyl - 3 - ethoxy-$\Delta^{3,5}$-10α-pregnadien-17α-ol-20-one derivatives, which upon reaction with approximately 1 molar equivalent of N-chlorosuccinimide or another N-chloro amide or imide, in the presence of sodium acetate and acetic acid, yield the corresponding 6β-chloro-19-lower alkyl-$\Delta^4$-10α-pregnene-17α,21-diol-3,20-dione 21-acetate derivatives (IV: Z=β-chlorine; $R^1$=acetyl).

The aforesaid 21-acetoxy-19-lower alkyl-3-ethoxy-$\Delta^{3,5}$-10α - pregnadien - 17α - ol - 20-one derivatives are treated with perchloryl fluoride in dimethylformamide, to produce the corresponding 6β-fluoro-19-lower alkyl-$\Delta^4$-10α-pregnene-17α,21 - diol-3,20-dione 21-acetate derivatives (IV: Z=β-fluorine; $R^1$=Acetyl).

The 6α-halo compounds of the present invention (IV: Z=α-halogen) may also be obtained by treatment of the corresponding 6β-halo compounds (IV: Z=β-halogen) with hydrogen-chloride in acetic acid, or with another mixture with similar acidity.

The 19-lower alkyl-$\Delta^4$-10α-pregnene-17α,21-diol-3,20-dione derivatives, mentioned theretofore (I, IV) upon incubation with adrenal glands in a suitable medium, e.g. an aqueous solution of alkali metal phosphates and chlorides and magnesium sulfate, mixed with an aqueous solution of fumric acid and sodium hydroxide, for a period of time of the order of 3 hours, at approximately 28–37° C., yield the corresponding 19-lower alkyl-Δ4-10α-pregnene-11β,17α,21-triol-3,20-dione derivatives (V).

The latter 11β-alcohols (V) are treated with mesyl chloride in dimethylformamide and pyridine at approximately 80° C. for about half an hour to produce the corresponding 19-lower alkyl-$\Delta^{4,9(11)}$-10α-pregnadiene-17α,21-diol-3,20-dione derivatives (VI).

The last named $\Delta^{4,9(11)}$-derivatives are treated with an N-bromo amide or imide, such as N-bromo acetamide, in the presence of perchloric acid, in an inert solvent, as for example, dioxane, to give the corresponding $\Delta^4$-9α-bromo-11β-alcohols which upon treatment with a mild base, such as potassium acetate in a suitable solvent, e.g. acetone, preferably at reflux temperature, afford the corresponding 19-lower alkyl-9β,11β-oxido-$\Delta^4$-10α-pregnene-17α,21-diol-3,20-dione compounds.

The latter 9β,11β-oxido compounds, upon treatment with a hydrogen halide, such as hydrogen fluoride or hydrogen chloride in a suitable inert organic solvent, e.g., methylene chloride or chloroform, yield the corresponding 9α-halo-19-lower alkyl-$\Delta^4$-10α-pregnene-11β,17α,21-triol-3,20-dione derivatives (VII: Q=OH; Y=halogen).

The 11β-hydroxyl group of the latter compounds and of the 9α-unsubstituted-11β-alcohols (IV), after previous conventional protection of the 21-hydroxyl group e.g. by esterification, is oxidized preferably with Jones' reagent (chromium trioxide in sulfuric acid), thus affording the corresponding 11-ketones (VII: Q=O).

The 19-lower alkyl-$\Delta^4$-10α-pregnene-11β,17α,21-triol-3,20-dione and 19-lower alkyl-$\Delta^4$-10α-pregnene-17α,21-diol-3,11,20-trione derivatives (VII) upon reaction with chloranil in terbutanol at reflux temperature, for approximately 8 hours, yields the corresponding $\Delta^{4,6}$-derivatives (VIII).

The 19-lower alkyl-$\Delta^4$-10α-pregnene derivatives represented by Formula VII are treated with 2,3-dichloro-5,6-dicyano-1,4-benzoquinone, in a suitable solvent, such as dioxane, preferably at reflux temperature for a period of time of the order of 10 hours, to produce the corresponding $\Delta^{1,4}$-pregnadiene derivatives (IX).

When treating the aforesaid $\Delta^{4,6}$-compounds (VIII) with 2,3-dichloro-5,6-dicyano-1,4-benzoquinone under the same conditions as described hereinbefore, there are obtained the corresponding $\Delta^{1,4,6}$-pregnatriene derivatives (X).

The compounds of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a 21-acyloxy group, are saponified by conventional treatment with a base to produce the corresponding 21-free alcohols, which in turn, may be acylated conventionally in pyridine with an acylating agent to give the corresponding 21-acylates, wherein the acyl group may be different from the previously saponified one.

The following specific examples serve to illustrate the present invention, but are not intended to limit the scope thereof:

Example I

A cooled solution of 4 g. of 19-methyl-Δ$^4$-10α-pregnen-17α-ol-3,20-dione (obtained according to my copending U.S. pat. appl. Ser. No. 262,236, filed March 1, 1963) in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the corresponding 21-iodo derivative. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding 19-methyl-Δ$^4$-10α-pregnene-17α,21-diol-3,20-dione 21-acetate (Cpd. No. 1).

Following the same procedure, the starting compounds listed under A (obtained in accordance with the aforesaid patent application), were converted into the corresponding products set forth under B.

| A | Cpd. No. | B |
|---|---|---|
| 19-methyl-16α,17α-isopropylidenedioxy-Δ$^4$-10α-pregnene-3,20-dione. | 2 | 19-methyl-16α-17α-isopropylidenedioxy-Δ$^4$-10α-pregnen-21-ol-3,20-dione acetate. |
| 16α,19-dimethyl-Δ$^4$-10α-pregnen-17α-ol-3,20-dione. | 3 | 16α,19-dimethyl-Δ$^4$-10α-pregnene-17α,21-diol-3,20-dione 21-acetate. |
| 16β,19-dimethyl-Δ$^4$-10α-pregnen-17α-ol-3,20-dione. | 4 | 16β,19-dimethyl-Δ$^4$-10α-pregnene-17α,21-diol-3,20-dione 21-acetate. |
| 19-ethyl-16α,17α-isopropylidenedioxy-Δ$^4$-10α-pregnene-3,20-dione. | 5 | 19-ethyl-16α,17α-isopropylidenedioxy-Δ$^4$-10α-pregnen-21-ol-3,20-dione acetate. |
| 19-ethyl-Δ$^4$-10α-pregnen-17α-ol-3,20-dione. | 6 | 19-ethyl-Δ$^4$-10α-pregnen-17α,21-diol-3,20-dione 21-acetate |
| 16α-methyl-19-ethyl-Δ$^4$-10α-pregnen-17α-ol-3,20-dione. | 7 | 16α-methyl-19-ethyl-Δ$^4$-10α-pregnen-17α,21-diol-3,20-dione 21-acetate. |
| 16β-methyl-19-ethyl-Δ$^4$-10α-pregnen-17α-ol-3,20-dione. | 8 | 16β-methyl-19-ethyl-Δ$^4$-10α-pregnen-17α,21-diol-3,20-dione 21-acetate. |

Example II

A mixture of 5 g. of 19-methyl-Δ$^4$-10α-pregnene-17α,21-diol-3,20-dione 21-acetate (Cpd. No. 1) 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 3,20-bis-cycloethylenedioxy - 19 - methyl - Δ$^5$ - 10α-pregnene-17α,21-diol 21-acetate (Cpd. No. 9).

The compounds Nos. 2 to 8, inclusive, were treated by the above procedure, thus affording respectively:

Cpd. No.:
10. 3,20-biscycloethylenedioxy-19-methyl - 16α,17α-isopropylidenedioxy-Δ$^5$-10α-pregnen-21-ol acetate.
11. 3,20-biscycloethylenedioxy16α,19-dimethyl - Δ$^5$-10α-pregnene-17α,21-diol 21-acetate.
12. 3,20-biscycloethylenedioxy-16β,19-dimethyl - Δ$^5$-10α-pregnene-17α,21-diol 21-acetate.
13. 3,20-biscycloethylenedioxy-19-ethyl-16α,17α- isopropylidenedioxy-Δ$^5$-10α-pregnen-21-ol acetate.
14. 3,20-biscycloethylenedioxy-19-ethyl-Δ$^5$-10α-pregnene-17α,21-diol 21-acetate.
15. 3,20 - biscycloethylenedioxy - 16α - methyl - 19-ethyl-Δ$^5$-10α-pregnene-17α,21-diol 21-acetate.
16. 3,20 - biscycloethylenedioxy - 16β - methyl-19-ethyl-Δ$^5$-10α-pregnene-17α,21-diol 21-acetate.

Example III

A solution of 2.5 g. of 3,20-biscycloethylenedioxy-19-methyl-Δ$^5$-10α-pregnene-17α,21-diol 21-acetate (Cpd. No. 9) in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 3,20-biscycloethylenedioxy-19-methyl - 5α,6α - oxido - 10α - pregnane-17α,21-diol 21-acetate (Cpd. No. 17).

The compounds Nos. 10 to 16, inclusive, were treated by the above procedure, thus affording respectively:

Cpd. No.:
18. 3,20-biscycloethylenedioxy-19-methyl - 16α,17α-isopropylidenedioxy-5α,6α-oxido-10α-pregnan - 21-ol acetate.
19. 3,20 - biscycloethylenedioxy - 16α,19 - dimethyl-5α,6α-oxido-10α-pregnane-17α,21-diol 21-acetate.
20. 3,20 - biscycloethylenedioxy - 16β,19 - dimethyl-5α,6α-oxido-10α-pregnane-17α,21-diol 21 - acetate.
21. 3,20-biscycloethylenedioxy - 19 - ethyl-16α,17α-isopropylidenedioxy-5α,6α-oxido-10α-pregnan - 21-ol acetate.
22. 3,20-biscycloethylenedioxy-19-ethyl-5α,6α-oxido-10α-pregnane-17α,21-diol-21-acetate.
23. 3,20-biscycloethylenedioxy - 16α - methyl - 19-6α,6α-oxido-10α-pregnane-17α,21-diol 21 - acetate. acetate.
24. 3,20-biscycloethylenedioxy - 16β - methyl - 19-ethyl-5α,6α-oxido-10α-pregnane - 17α,21 - diol 21-acetate.

Example IV

To a solution of 40 cc. of 4 N methylmagnesium bromide in ether was added, with stirring, a solution of 2 g. of 3,20-biscycloethylenedioxy-19-methyl-5α,6α-oxido-10α-pregnane - 17α,21-diol 21-acetate (Cpd. No. 17) in 60 cc. of dry tetrahydrofuran and the stirred mixture heated under reflux for 30 minutes. The condenser was then replaced by a calcium chloride tube, the ether allowed to boil off and when the internal temperature reached 54° C, the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated to dryness.

A solution of the resulting residue in 70 cc. of methanol and 7 cc. of 8% aqueous sulfuric acid was refluxed for 40 minutes. It was then neutralized with saturated sodium carbonate solution, concentrated to ca. 20 cc. in vacuo and poured into water. The formed precipitate was filtered off, washed thoroughly with water and dried.

A solution of the dry precipitate in 7 cc. of dry pyridine was cooled to $-10°$ C, treated with 0.4 cc. of thionyl chloride and the mixture allowed to stand for 4 minutes at this temperature. Ice-water was added and the crystalline precipitate was filtered, washed and dried, yielding $6\beta,19$-dimethyl-$\Delta^4$-$10\alpha$-pregnene-$17\alpha,21$-diol-3,20-dione (Cpd. No. 25).

The compounds Nos. 18 to 24, inclusive, were treated by the above method, thus affording respectively:

Cpd. No.:
26. $6\beta,19$-dimethyl-$16\alpha,17\alpha$-isopropylidenedioxy-$\Delta^4$-$10\alpha$-pregnen-21-ol-3,20-dione.
27. $6\beta,16\alpha,19$-trimethyl-$\Delta^4$-$10\alpha$-pregnene-$17\alpha,21$-diol-3,20-dione.
28. $6\beta,16\beta,19$-trimethyl-$\Delta^4$-$10\alpha$-pregnene-$17\alpha,21$-diol-3,20-dione.
29. $6\beta$-methyl-19-ethyl-$16\alpha,17\alpha$-isopropylidenedioxy-$\Delta^4$-$10\alpha$-pregnen-21-ol-3,20-dione.
30. $6\beta$-methyl-19-ethyl-$\Delta^4$-$10\alpha$-pregnene-$17\alpha,21$-diol-3,20-dione.
31. $6\beta,16\alpha$-dimethyl-19-ethyl-$\Delta^4$-$10\alpha$-pregnene-$17\alpha,21$-diol-3,20-dione.
32. $6\beta,16\beta$-dimethyl-19-ethyl-$\Delta^4$-$10\alpha$-pregnene-$17\alpha,21$-diol-3,20-dione.

*Example V*

1 g. of $6\beta,19$-dimethyl-$\Delta^4$-$10\alpha$-pregnene-$17\alpha,21$-diol-3,20-dione (Cpd. No. 25) was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetone-hexane yielded $6\alpha,19$-dimethyl-$\Delta^4$-$10\alpha$-pregnene-$17\alpha,21$-diol-3,20-dione (Cpd. No. 3).

The compounds Nos. 26 to 32, inclusive, were treated by the above method, thus affording respectively:

Cpd. No.:
34. $6\alpha,19$-dimethyl-$16\alpha,17\alpha$-isopropylidenedioxy-$\Delta^4$$10\alpha$-pregnen-21-ol-3,20-dione.
35. $6\alpha,16\alpha,19$-trimethyl-$\Delta^4$-$10\alpha$-pregnene-$17\alpha,21$-diol-3,20-dione.
36. $6\alpha,16\beta,19$-trimethyl-$\Delta^4$-$10\alpha$-pregnene-$17\alpha,21$-diol-3,20-dione.
37. $6\alpha$-methyl-19-ethyl-$16\alpha,17\alpha$-isopropylidenedioxy-$\Delta^4$-$10\alpha$-pregnen-21-ol-3,20-dione.
38. $6\alpha$-methyl-19-ethyl-$\Delta^4$-$10\alpha$-pregnene-$17\alpha,21$-diol-3,20-dione.
39. $6\alpha,16\alpha$-dimethyl-19-ethyl-$\Delta^4$-$10\alpha$-pregnene-$17\alpha,21$-diol-3,20-dione.
40. $6\alpha,16\beta$-dimethyl-19-ethyl-$\Delta^4$-$10\alpha$-pregnene-$17\alpha,21$-diol-3,20-dione.

*Example VI*

Into a suspension of 1 g. of 3,20-biscycloethylenedioxy-19-methyl-$5\alpha,6\alpha$-oxido-$10\alpha$-pregnane-$17\alpha,21$-diol 21-acetate (Cpd. No. 17) in 35 cc. of glacial acetic acid, was passed a slow stream of dry hydrogen chloride; after 10 minutes all the solid material was dissolved. The gas was passed through the reaction mixture for a total of 5 hours. The solution was concentrated to about one-third its initial volume by distillation under reduced pressure at 35° C., then it was poured into ice-water. The precipitate formed was collected, washed with water to neutrality and dried. Recrystallization from methylene chloride afforded $6\alpha$-chloro-19-methyl-$\Delta^4$-$10\alpha$-pregnene-$17\alpha,21$-diol-3,20-dione 21-acetate (Cpd. No. 41).

The compounds Nos. 18 to 24, inclusive, were treated by the above method, thus affording respectively:

Cpd. No.:
42. $6\alpha$-chloro-19-methyl-$16\alpha,17\alpha$-isopropylidenedioxy-$\Delta^4$-$10\alpha$-pregnen-21-ol-3,20-dione acetate.
43. $6\alpha$-chloro-$16\alpha,19$-dimethyl-$\Delta^4$-$10\alpha$-pregnene-$17\alpha,21$-diol-3,20-dione 21-acetate.
44. $6\alpha$-chloro-$16\beta,19$-dimethyl-$\Delta^4$-$10\alpha$-pregnene-$17\alpha,21$-diol-3,20-dione 21-acetate.
45. $6\alpha$-chloro-19-ethyl-$16\alpha,17\alpha$-isopropylidenedioxy-$\Delta^4$-$10\alpha$-pregnen-21-ol-3,20-dione acetate.
46. $6\alpha$-chloro-19-ethyl-$\Delta^4$-$10\alpha$-pregnene-$17\alpha,21$-diol-3,20-dione 21-acetate.
47. $6\alpha$-chloro-$16\alpha$-methyl-19-ethyl-$\Delta^4$-$10\alpha$-pregnene-$17\alpha$-$21$-diol-3,20-dione 21-acetate.
48. $6\alpha$-chloro-$16\beta$-methyl-19-ethyl-$\Delta^4$-$10\alpha$-pregnene-$17\alpha,21$-diol-3,20-dione 21-acetate.

*Example VII*

2.8 cc. of boron trifluoride etherate was slowly added with stirring to 220 mg. of anhydrous hydrogen fluoride cooled in an acetone-Dry Ice bath.

To a solution of 1 g. of compound No. 17 in 10 cc. of a mixture of equal parts of benzene and ether was added 1.3 cc. of the fluoroboric acid reagent. The mixture was kept for 3 hours at room temperature, then washed four times with water, dried over anhydrous sodium sulfate and the solvent evaporated under reduced pressure. The residue was suspended in 40 cc. of ethyl acetate and there was passed a slow stream of dry hydrogen chloride. The gas was passed through the reaction mixture for a total of 5 hours. The solution was then washed abundantly with water, dried and evaporated to dryness. The residue was washed with water to neutrality and dried. Recrystallization from methylene chloride-hexane afforded $6\alpha$-fluoro-19-methyl-$\Delta^4$-$10\alpha$-pregnene-$17\alpha,21$-diol-3,20-dione 21-acetate (Cpd. No. 49).

The compounds Nos. 18 to 24, inclusive, were treated by the above method, thus affording respectively:

Cpd. No.:
50. $6\alpha$-fluoro-19-methyl-$16\alpha,17\alpha$-isopropylidenedioxy-$\Delta^4$-$10\alpha$-pregnen-21-ol-3,20-dione acetate.
51. $6\alpha$-fluoro-$16\alpha,19$-dimethyl-$\Delta^4$-$10\alpha$-pregnene-$17\alpha,21$-diol-3,20-dione 21-acetate.
52. $6\alpha$-fluoro-$16\beta,19$-dimethyl-$\Delta^4$-$10\alpha$-pregnene-$17\alpha,21$-diol-3,20-dione 21-acetate.
53. $6\alpha$-fluoro-19-ethyl-$16\alpha,17\alpha$-isopropylidenedioxy-$\Delta^4$-$10\alpha$-pregnen-21-ol-3,20-dione acetate.
54. $6\alpha$-fluoro-19-ethyl-$\Delta^4$-$10\alpha$-pregnene-$17\alpha,21$-diol-3,20-dione 21-acetate.
55. $6\alpha$-fluoro-$16\alpha$-methyl-19-ethyl-$\Delta^4$-$10\alpha$-pregnene-$17\alpha,21$-diol-3,20-dione 21-acetate.
56. $6\alpha$-fluoro-$16\beta$-methyl-19-ethyl-$\Delta^4$-$10\alpha$-pregnene-$17\alpha,21$-diol-3,20-dione 21-acetate.

*Example VIII*

A suspension of 5 g. of 19-methyl-$\Delta^4$-$10\alpha$-pregnene-$17\alpha,21$-diol-3,20-dione 21-acetate (Cpd. No. 1) in 37.5 cc. of anhydrous peroxide-free dioxane, was treated with 6.2 cc. of freshly distilled ethyl orthoformate and 2.5 g. of p-toulenesulfonic acid. The mixture was stirred at room temperature for 15 minutes and the resulting solution let stand for 30 minutes further. 4 cc. of pyridine were added and then water. The formed precipitate was collected by filtration, water washed and air dried. Recrystallization from acetone-hexane afforded 3-ethoxy-19-methyl-$\Delta^{3,5}$-$10\alpha$-pregnadiene-$17\alpha,21$-diol-20-one 21-acetate (Cpd. No. 57).

By the same procedure, there were treated the compounds Nos. 2 to 8, inclusive, thus yielding respectively:

Cpd. No.:
58. 3-ethoxy-19-methyl-16α,17α-isopropylidenedioxy-Δ$^{3,5}$-10α-pregnadien-21-ol-20-one acetate.
59. 3-ethoxy-16α,19-dimethyl-Δ$^{3,5}$-10α-pregnadiene-17α,21-diol-20-one 21-acetate.
60. 3-ethoxy-16β,19-dimethyl-Δ$^{3,5}$-10α-pregnadiene-17α,21-diol-20-one 21-acetate.
61. 3-ethoxy-19-ethyl-16α,17α-isopropylidenedioxy-Δ$^{3,5}$-10α-pregnadien-21-ol-20-one acetate.
62. 3-ethoxy-19-ethyl-Δ$^{3,5}$-10α-pregnadiene-17α,21-diol-20-one 21-acetate.
63. 3-ethoxy-16α-methyl-19-ethyl-Δ$^{3,5}$-10α-pregnadiene-17α,21-diol-20-one 21-acetate.
64. 3-ethoxy-16β-methyl-19-ethyl-Δ$^{3,5}$-10α-pregnadiene-17α,21-diol-20-one 21-acetate.

*Example IX*

A mixture of 5 g. of 3-ethoxy-19-methyl-Δ$^{3,5}$-10α-pregnadiene-17α,21-diol-20-one 21-acetate (Cpd. No. 57), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C for 30 minutes. It was then diluted with water, kept overnight at 0° C. and the precipitate formed was collected, washed with water, dried under vacuum and recrystallized from acetone thus giving 6β-chloro-19-methyl-Δ$^4$-10α-pregnene-17α,21-diol-3,20-dione 21-acetate (Cpd. No. 65).

The compounds Nos. 58 to 64, inclusive, were treated by the above method, thus affording respectively:

Cpd. No.:
66. 6β-chloro-19-methyl-16α,17α-isopropylidenedioxy-Δ$^4$-10α-pregnene-21-ol-3,20-dione acetate.
67. 6β-chloro-16α,19-dimethyl-Δ$^4$-10α-pregnene-17α,21-diol-3,20-dione 21-acetate.
68. 6β-chloro-16β,19-dimethyl-Δ$^4$-10α-pregnene-17α,21-diol-3,20-dione 21-acetate.
69. 6β-chloro-19-ethyl-16α,17α-isopropylidenedioxy-Δ$^4$-10α-pregnen-21-ol-3-ol-3,20-dione acetate.
70. 6β-chloro-19-ethyl-Δ$^4$-10α-pregnene-17α,21-diol-3,20-dione 21-acetate.
71. 6β-chloro-16α-methyl-19-ethyl-Δ$^4$-10α-pregnene-17α,21-diol-3,20-dione 21-acetate.
72. 6β-chloro-16β-methyl-19-ethyl-Δ$^4$-10α-pregnene-17,21-diol-3,20-dione 21-acetate.

*Example X*

1 g. of 3-ethoxy-19-methyl-Δ$^{3,5}$-10α-pregnadiene-17α,21-diol-20-one 21-acetate (Cpd. No. 57) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was produced 6β-fluoro-19-methyl-Δ$^4$-10α-pregnene-17α,21-diol-3,20-dione 21-acetate (Cpd. No. 73).

The compounds Nos. 58 to 64, inclusive, were treated by the above method, thus affording respectively:

Cpd. No.:
74. 6β-fluoro-19-methyl-16α,17α-isopropylidenedioxy-Δ$^4$-10α-pregnen-21-ol-3,20-dione acetate.
75. 6β-fluoro-16α,19-dimethyl-Δ$^4$-10α-pregnene-17α,21-diol-3,20-dione 21-acetate.
76. 6β-fluoro-16β,19-dimethyl-Δ$^4$-10α-pregnene-17α,21-diol-3,20-dione 21-acetate.

Cpd. No.:
77. 6β-fluoro-19-ethyl-16α,17α-isopropylidenedioxy-Δ$^4$-10α-pregnen-21-ol-3,20-dione acetate.
78. 6β-fluoro-19-ethyl-Δ$^4$-10α-pregnene-17α,21-diol-3,20-dione 21-acetate.
79. 6β-fluoro-16α-methyl-19-ethyl-Δ$^4$-10α-pregnene-17α,21-diol-3,20-dione 21-acetate.
80. 6β-fluoro-16β-methyl-19-ethyl-Δ$^4$-10α-pregnene-17α,21-diol-3,20-dione 21-acetate.

*Example XI*

The following solutions "A", "B," and "C" were prepared using distilled water as solvent: solution "A" was prepared by mixing 425 cc. of a 1.74% dipotassic phosphate solution (K$_2$HPO$_4$) with 75 cc. of 1.38% monosodic phosphate; solution "B" was prepared by diluting a mixture of 1 lt. of 4.5% sodium chloride solution, 40 cc. of a 5.75% potassium chloride solution and 10 cc. of a 19.1% magnesium sulfate solution, to a volume of 5 lt. solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

Adrenal glands of recently slaughtered cattle, defatted, were ground in a meat grinder until a homogeneous mass was obtained; to 1 kg. of homogenate was added 2 liters of the mixture of A, B, and C solutions with vigorous stirring. To the mixture there was then added 1 g. of 19-methyl-Δ$^4$-10α-pregnene-17α,21-diol-3,20-dione 21-acetate (Cpd. No. 1) dissolved in 5.30 cc. of propyleneglycol, the mixture was stirred at 28–37° C. for 3 hours, 13 liters of acetone were added and the mass was stirred at room temperature for an additional 1 hour.

The acetone extract was separated by filtration the ground adrenals were washed with 6 liters of acetone, the extracts were combined and the solvent removed by distillation under reduced pressure. Chromatography on alumina and crystallization of the solid fractions afforded 19-methyl-Δ$^4$-10α-pregnene-11β,17α,21-triol-3,20-dione 21-acetate (Cpd. No. 81).

The compounds Nos. 2 to 8, inclusive, were treated by the above procedure, thus affording respectively:

Cpd. No.:
82. 19-methyl-16α,17α-isopropylidenedioxy-Δ$^4$-10α-pregnene-11β,21-diol-3,20-dione 21-acetate.
83. 16α,19-dimethyl-Δ$^4$-10α-pregnene-11β,17α,21-triol-3,20-dione 21-acetate.
84. 16β,19-dimethyl-Δ$^4$-10α-pregnene-11β,17α,21-triol-3,20-dione 21-acetate.
85. 19-ethyl-16α,17α-isopropylidenedioxy-Δ$^4$-10α-pregnene-11β,21-diol-3,20-dione 21-acetate.
86. 19-ethyl-Δ$^4$-10α-pregnene-11β,17α,21-triol-3,20-dione-21-acetate.
87. 16α-methyl-19-ethyl-Δ$^4$-10α-pregnene-11β,17α,21-triol-3,20-dione 21-acetate.
88. 16β-methyl-19-ethyl-Δ$^4$-10α-pregnene-11β,17α,21-triol-3,20-dione 21-acetate.

*Example XII*

The compounds Nos. 25 to 56, inclusive, were treated following the procedure described in the foregoing example, thus affording respectively:

Cpd. No.:
89. 6β,19-dimethyl-Δ$^4$-10α-pregnene-11β,17α,21-triol-3,20-dione.
90. 6β,19-dimethyl-16α,17α-isopropylidenedioxy-Δ4-10α-pregnene-11β,21-diol-3,20-dione.
91. 6β,16α,19-trimethyl-Δ$^4$-10α-pregnene-11β,17α,21-triol-3,20-dione.
92. 6β,16β,19-trimethyl-Δ$^4$-10α-pregnene-11β,17α,21-triol-3,20-dione.
93. 6β-methyl-19-ethyl-16α,17α-isopropylidenedioxy-Δ$^4$-10α-pregnene-11β,21-diol-3,20-dione.

Cpd. No.:
94. 6β-methyl-19-ethyl-Δ⁴-10α-pregnene-11β,17α,21-triol-3,20-dione.
95. 6β,16α-dimethyl-19-ethyl-Δ⁴-10α-pregnene-11β,17α,21-triol-3,20-dione.
96. 6β,16β-dimethyl-19-ethyl-Δ⁴-10α-pregnene-11β,17α,21-triol-3,20-dione.
97. 6α,19-dimethyl-19-ethyl-Δ⁴-10α-pregnene-11β,17α,21-triol-3,20-dione.
98. 6α,19-dimethyl-19-ethyl-16α,17α-isopropylidenedioxy-Δ⁴-10α-pregnene-11β,21-diol-3,20-dione.
99. 6α,16α,19-trimethyl-19-ethyl-Δ⁴-10α-pregnene-11β,17α,21-triol-3,20-dione.
100. 6α,16β,19-trimethyl-19-ethyl-Δ⁴-10α-pregnene-11β,17α,21-triol-3,20-dione.
101. 6α-methyl-19-ethyl-16α,17α-isopropylidenedioxy-Δ⁴-10α-pregnene-11β,21-diol-3,20-dione.
102. 6α-methyl-19-ethyl-Δ⁴-10α-pregnene-11β,17α,21-triol-3,20-dione.
103. 6α,16α-dimethyl-19-ethyl-Δ⁴-10α-pregnene-11β,17α,21-triol-3,20-dione.
104. 6α,16β-dimethyl-19-ethyl-Δ⁴-10α-pregnene-11β,17α,21-triol-3,20-dione.
105. 6α-chloro-19-methyl-Δ⁴-10α-pregnene-11β,17α,21-triol-3,20-dione 21-acetate.
106. 6α-chloro-19-methyl-16α,17α-isopropylidenedioxy-Δ⁴-10α-pregnene-11β,21-diol-3,20-dione 21-acetate.
107. 6α-chloro-16α,19-dimethyl-Δ⁴-10α-pregnene-11β,17α,21-triol-3,20-dione 21-acetate.
108. 6α-chloro-16β,19-dimethyl-Δ⁴-10α-pregnene-11β,17α,21-triol-3,20-dione 21-acetate.
109. 6α - chloro - 19 - ethyl - 16α,17α - isopropylidenedioxy - Δ⁴ - 10α - pregnene - 11β,21 - diol - 3,20 - dione 21-acetate.
110. 6α - chloro - 19 - ethyl - Δ⁴ - 10α - pregnene - 11β,17α,21 - triol - 3,20 - dione 21 - acetate.
111. 6α - chloro - 16α - methyl - 19 - ethyl - Δ⁴ - 10α - pregnene - 11β,17α - 21 - triol - 3,20 - dione 21 - acetate.
112. 6α - chloro - 16β - methyl - 19 - ethyl - Δ⁴ - 10α - pregnene - 11β,17α,21 - triol - 3,20 - dione 21 - acetate.
113. 6α - fluoro - 19 - methyl - Δ⁴ - 10α - pregnene - 11β,17α,21 - triol - 3,20 - dione 21 - acetate.
114. 6α - fluoro - 19 - methyl - 16α,17α - isopropylidenedioxy - Δ⁴ - 10α - pregnene - 11β,21 - diol - 3,20 - dione 21 - acetate.
115. 6α - fluoro - 16α,19 - dimethyl - Δ⁴ - 10α - pregnene - 11β,17α,21 - triol - 3,20 - dione 21 - acetate.
116. 6α - fluoro - 16β,19 - dimethyl - Δ⁴ - 10α - pregnene - 11β,17α,21 - triol - 3,20 - dione 21 - acetate.
117. 6α - fluoro - 19 - ethyl - 16α,17α - isopropylidenedioxy - Δ⁴ - 10α - pregnene - 11β,21 - diol - 3,20 - dione 21 - acetate.
118. 6α - fluoro - 19 - ethyl - Δ⁴ - 10α - pregnene - 11β,17α,21 - triol - 3,20 - dione 21 - acetate.
119. 6α - fluoro - 16α - methyl - 19 - ethyl - Δ⁴ - 10α - pregnene - 11β,17α,21 - triol - 3,20 - dione 21 - acetate.
120. 6α - fluoro - 16β - methyl - 19 - ethyl - Δ⁴ - 10α - pregnene - 11β,17α,21 - triol - 3,20 - dione 21 - acetate.

*Example XIII*

The compounds Nos. 65 to 80, inclusive, were treated in accordance with the procedure described in Example XI, thus affording respectively:

Cpd. No:
121. 6β - chloro - 19 - methyl - Δ⁴ - 10α - pregnene - 11β,17α,21 - triol - 3,20 - dione 21 - acetate.
122. 6β - chloro - 19 - methyl - 16α,17α - isopropylidenedioxy - Δ⁴ - 10α - pregnene - 11β,21 - diol - 3,20 - dione 21 - acetate.
123. 6β - chloro - 16α,19 - dimethyl - Δ⁴ - 10α - pregnene - 11β,17α,21 - triol - 3,20 - dione 21 - acetate.
124. 6β - chloro - 16β,19 - dimethyl - Δ⁴ - 10α - pregnene - 11β,17α,21 - triol - 3,20 - dione 21 - acetate.

*Example XIV*

5 g. of 19-methyl-Δ⁴-10α-pregnene-11β,17α,21-triol-3,20-dione 21-acetate (Cpd. No. 81) was dissolved with slow heating in 72.5 cc. of dimethylformamide, the mixture was cooled, 2.1 g. of mesyl chloride and 2.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 19 - methyl - Δ⁴,⁹⁽¹¹⁾ - 10α - pregnadiene - 17α,21 - diol-3,20-dione 21-acetate.

2.8 g. of N-bromoacetamide were added to a mixture of 5 g. of the latter steroid, 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium-starch indicator paper no longer turned blue, ice was added, the mixture was extracted with chloroform and the extract was washed consecutively with water, 5% aqueous sodium bicarbonate solution and water, and the solvent was removed by distillation under vacuo. By trituration of the residue with acetone there was obtained the corresponding 9α-bromo-11β-ol-derivative.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then re-refluxed for 10 hours, cooled and almost all of the acetone was distilled off; iced-water was then added, the precipitate was filtered, washed with water and dried. Upon recrystallization from methylene chloride-benzene there was obtained 9β,11β - oxido - 19 - methyl - Δ⁴ - 10α - pregnene - 17α,21 - diol - 3,20 - dione 21 - acetate (Cpd. No. 137).

Following exactly the same procedures, the compounds Nos. 82 to 136, inclusive, were successively converted into the corresponding Δ⁴,⁹⁽¹¹⁾ - 10α - pregnadiene derivatives, the corresponding Δ⁴-9α-bromo-11β - alcohols and then respectively into the following oxido compounds.

Cpd. No.:
138. 9β,11β - oxido - 19 - methyl - 16α,17α - isopropylidenedioxy - Δ⁴ - 10α - pregnen - 21 - ol - 3,20 - dione acetate.
139. 9β,11β - oxido - 16α,19 - dimethyl - Δ⁴ - 10α - pregnene - 17α,21 - diol - 3,20 - dione 21 - acetate.
140. 9β,11β - oxido - 16β,19 - dimethyl - Δ⁴ - 10α - pregnene - 17α,21 - diol - 3,20 - dione 21 - acetate.
141. 9β,11β - oxido - 19 - ethyl - 16α,17α - isopropylidenedioxy - Δ⁴ - 10α - pregnen - 21 - ol - 3,20 - dione acetate.
142. 9β,11β - oxido - 19 - ethyl - Δ⁴ - 10α - pregnene - 17α,21 - diol - 3,20 - dione 21 - acetate.
143. 9β,11β oxido - 16α - methyl - 19 - ethyl - Δ⁴ - 10α - pregnene - 17α,21 - diol - 3,20 - dione 21 - acetate.
144. 9β,11β - oxido - 16β - methyl - 19 - ethyl - Δ⁴ - 10α - pregnene - 17α - 21 - diol - 3,20 - dione 21 - acetate.
145. 9β,11β - oxido - 6α,19 - dimethyl - Δ⁴ - 10α - pregnene - 17α,21 - diol - 3,20 - dione.
146. 9β,11β - oxido - 6β,19 - dimethyl - 16α,17α - isopropylidenedioxy - Δ⁴ - 10α - pregnen - 21 - ol - 3,20-dione.

Cpd. No.:
147. 9β,11β - oxido - 6β,16α,19 - trimethyl - Δ⁴ - 10α - pregnene - 17α - 21 - diol - 3,20 - dione.
148. 9β,11β - oxido - 6β,16β,19 - trimethyl - Δ⁴ - 10α - pregnene - 17α - 21 - diol - 3,20 - dione.
149. 9β,11β - oxido - 6β - methyl - 19 - ethyl - 16α,17α - isopropylidenedioxy - Δ⁴ - 10α - pregnen - 21-ol-3,20-dione.
150. 9β,11β - oxido - 6β - methyl - 19 - ethyl - Δ⁴ - 10α - pregnene - 17α - 21 - diol - 3,20 - dione.
151. 9β,11β - oxido - 6β,16α - dimethyl - 19 - ethyl - Δ⁴ - 10α - pregnene - 17α,21 - diol - 3,20 - dione.
152. 9β,11β - oxido - 6β,16β - dimethyl - 19 - ethyl - Δ⁴ - 10α - pregnene - 17α,21 - diol - 3,20 - dione.
153. 9β,11β - oxido - 6α,19 - dimethyl - Δ⁴ - 10α - pregnene - 17α,21 - diol - 3,20 - dione.
154. 9β,11β-oxido-6α,19-dimethyl-16α,17α-isopropylidenedioxy-Δ⁴-10α-pregnen-21-ol-3,20-dione.
155. 9β,11β-oxido-6α,16α,19-trimethyl-Δ⁴-10α-pregnene-17α,21-diol-3,20-dione.
156. 9β,11β-oxido-6α,16β,19-trimethyl-Δ⁴-10α-pregnene-17α,21-diol-3,20-dione.
157. 9β,11β-oxido-6α-methyl-19-ethyl-16α,17α-isopropylidenedioxy-Δ⁴-10α-pregnen-21-ol-3,20-dione.
158. 9β,11β-oxido-6α-methyl-19-ethyl-Δ⁴-10α-pregnene-17α,21-diol-3,20-dione.
159. 9β,11β-oxido-6α,16α-dimethyl-19-ethyl-Δ⁴-10α-pregnene-17α,21-diol-3,20-dione.
160. 9β,11β-oxido-6α,16β-dimethyl-19-ethyl-Δ⁴-10α-pregnene-17α,21-diol-3,20-dione.
161. 9β,11β-oxido-6α-chloro-19-methyl-Δ⁴-10α-pregnene-17α,21-diol-3,20-dione 21-acetate.
162. 9β,11β-oxido-6α-chloro-19-methyl-16α,17α-isopropylidenedioxy-Δ⁴-10α-pregnen-21-ol-3,20-dione acetate.
163. 9β,11β-oxido-6α-chloro-16α,19-dimethyl-Δ⁴-10α-pregnene-17α,21-diol-3,20-dione 21-acetate.
164. 9β,11β-oxido-6α-chloro-16β,19-dimethyl-Δ⁴-10α-pregnene-17α,21-diol-3,20-dione 21-acetate.
165. 9β,11β-oxido-6α-chloro-19-ethyl-16α,17α-isopropylidenedioxy-Δ⁴-10α-pregnen-21-ol-3,20-dione acetate.
166. 9β,11β-oxido-6α-chloro-19-ethyl-Δ⁴-10α-pregnene-17α,21-diol-3,20-dione 21-acetate.
167. 9β,11β-oxido-6α-chloro-16α-methyl-19-ethyl-Δ⁴-10α-pregnene-17α,21-diol-3,20-dione 21-acetate.
168. 9β,11β-oxido-6α-chloro-16β-methyl-19-ethyl-Δ⁴-10α-pregnene-17α,21-diol-3,20-dione 21-acetate.
169. 9β,11β-oxido-6α-fluoro-19-methyl-Δ⁴-10α-pregnene-17α,21-diol-3,20-dione 21-acetate.
170. 9β,11β-oxido-6α-fluoro-19-methyl-16α,17α-isopropylidenedioxy-Δ⁴-10α-pregnen-21-ol-3,20-dione acetate.
171. 9β,11β-oxido-6α-fluoro-16α,19-dimethyl-Δ⁴-10α-pregnene-17α,21-diol-3,20-dione 21-acetate.
172. 9β,11β-oxido-6α-fluoro-16β,19-dimethyl-Δ⁴-10α-pregnene-17α,21-diol-3,20-dione 21-acetate.
173. 9β,11β-oxido-6α-fluoro-19-ethyl-16α,17α-isopropylidenedioxy-Δ⁴-10α-pregnen-21-ol-3,20-dione acetate.
174. 9β,11β-oxido-6α-fluoro-19-ethyl-Δ⁴-10α-pregnene-17α,21-diol-3,20-dione 21-acetate.
175. 9β,11β-oxido-6α-fluoro-16α-methyl-19-ethyl-Δ⁴-10α-pregnene-17α,21-diol-3,20-dione 21-acetate.
176. 9β,11β-oxido-6α-fluoro-16β-methyl-19-ethyl-Δ⁴-10α-pregnene-17α,21-diol-3,20-dione 21-acetate.
177. 9β,11β-oxido-6β-chloro-19-methyl-Δ⁴-10α-pregnene-17α,21-diol-3,20-dione 21-acetate.
178. 9β,11β-oxido-6β-chloro-19-methyl-16α,17α-isopropylidenedioxy-Δ⁴-10α-pregnen-21-ol-3,20-dione acetate.
179. 9β,11β-oxido-6β-chloro-16α,19-dimethyl-Δ⁴-10α-pregnene-17α,21-diol-3,20-dione 21-acetate.

Cpd. No.:
180. 9β,11β-oxido-6β-chloro-16β,19-dimethyl-Δ⁴-10α-pregnene-17α,21-diol-3,20-dione 21-acetate.
181. 9β,11β-oxido-6β-chloro-19-ethyl-16α,17α-isopropylidenedioxy-Δ⁴-10α-pregnen-21-ol-3,20-dione acetate.
182. 9β,11β-oxido-6β-chloro-19-ethyl-Δ⁴-10α-pregnene-17α,21-diol-3,20-dione 21-acetate.
183. 9β,11β-oxido-6β-chloro-16α-methyl-19-ethyl-Δ⁴-10α-pregnene-17α,21-diol-3,20-dione 21-acetate.
184. 9β,11β-oxido-6β-chloro-16β-methyl-19-ethyl-Δ⁴-10α-pregnene-17α,21-diol-3,20-dione 21-acetate.
185. 9β,11β-oxido-6β-fluoro-19-methyl-Δ⁴-10α-pregnene-17α,21-diol-3,20-dione 21-acetate.
186. 9β,11β-oxido-6β-fluoro-19-methyl-16α,17α-isopropylidenedioxy-Δ⁴-10α-pregnen-21-ol-3,20-dione acetate.
187. 9β,11β-oxido-6β-fluoro-16α,19-dimethyl-Δ⁴-10α-pregnene-17α,21-diol-3,20-dione 21-acetate.
188. 9β,11β-oxido-6β-fluoro-16β,19-dimethyl-Δ⁴-10α-pregnene-17α,21-diol-3,20-dione 21-acetate.
189. 9β,11β-oxido-6β-fluoro-19-ethyl-16α,17α-isopropylidenedioxy-Δ⁴-10α-pregnen-21-ol-3,20-dione acetate.
190. 9β,11β-oxido-6β-fluoro-19-ethyl-Δ⁴-10α-pregnene-17α,21-diol-3,20-dione 21-acetate.
191. 9β,11β-oxido-6β-fluoro-16α-methyl-19-ethyl-Δ⁴-10α-pregnene-17α,21-diol-3,20-dione 21-acetate.
192. 9β,11β-oxido-6β-fluoro-16β-methyl-19-ethyl-Δ⁴-10α-pregnene-17α,21-diol-3,20-dione 21-acetate

*Example XV*

In a polyethylene flask, adapted with magnetic stirrer, there was dissolved 1.8 g. of 9β,11β-oxido-19-methyl-Δ⁴-10α-pregnene-17α,21 - diol - 3,20-dione 21-acetate (Cpd. No. 137), in 30 cc. of methylene chloride, the solution was cooled to 0° C. and a solution of 2.11 g. of anhydrous hydrogen fluoride in 3.7 cc. of tetrahydrofurane cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby there crystallized 9α-fluoro-19-methyl-Δ⁴-pregnene-11β,17α,21-triol-3,20-dione 21-acetate (Cpd. No. 193).

When applying the above procedure to the compounds Nos. 138 to 192, inclusive, there were respectively obtained:

Cpd. No.:
194. 9α-fluoro-19-methyl-16α,17α-isopropylidenedioxy-Δ⁴-10α-pregnene-11β,21-diol-3,20-dione 21-acetate.
195. 9α-fluoro-16α,19-dimethyl-Δ⁴-10α-pregnene-11β,17α-21-triol-3,20-dione 21-acetate.
196. 9α-fluoro-16β,19-dimethyl-Δ⁴-10α-pregnene-11β,17α,21-triol-3,20-dione 21-acetate.
197. 9α-fluoro-19-ethyl-16α,17α-isopropylidenedioxy-Δ⁴-10α-pregnene-11β,21-diol-2,20-dione 21-acetate.
198. 9α-fluoro-19-ethyl-Δ⁴-10α-pregnene-11β,17α,21-triol-3,20-dione 21-acetate.
199. 9α-fluoro-16α-methyl-19-ethyl-Δ⁴-10α-pregnene-11β,17α,21-triol-3,20-dione 21-acetate.
200. 9α-fluoro-16β-methyl-19-ethyl-Δ⁴-10α-pregnene-11β,17α,21-triol-3,20-dione 21-acetate.

Cpd. No.:
201. 9α-fluoro-16β,19-dimethyl-Δ⁴-10α-pregnene-11β,17α,21-triol-3,20-dione.
202. 9α-fluoro-6β,19-dimethyl-16α,17α-isopropylidenedioxy-Δ⁴-10α-pregnene-11β,21-diol-3,20-dione.
203. 9α-fluoro-6β,16α,19-trimethyl-Δ⁴-10α-pregnene-11β,17α,21-triol-3,20-dione.
204. 9α-fluoro-6β,16β,19-trimethyl-Δ⁴-10α-pregnene-11β,17α,21-triol-3,20-dione.
205. 9α-fluoro-6β-methyl-19-ethyl-16α,17α-isopropylidenedioxy-Δ⁴-10α-pregnene-11β,21-diol-3,20-dione.
206. 9α-fluoro-6β-methyl-19-ethyl-Δ⁴-10α-pregnene-11β,17α,21-triol-3,20-dione.
207. 9α-fluoro-6β,16α-dimethyl-19-ethyl-Δ⁴-10α-pregnene-11β,17α,21-triol-3,20-dione.
208. 9α-fluoro-6β,16β-dimethyl-19-ethyl-Δ⁴-10α-pregnene-11β,17α,21-triol-3,20-dione.
209. 9α-fluoro-6α,19-dimethyl-Δ⁴-10α-pregnene-11β,17α,21-triol-3,20-dione.
210. 9α-fluoro-6α,19-dimethyl-16α,17α-isopropylidenedioxy-Δ⁴-10α-pregnene-11β,21-diol-3,20-dione.
211. 9α-fluoro-6α,16α,19-trimethyl-Δ⁴-10α-pregnene-11β,17α,21-triol-3,20-dione.
212. 9α-fluoro-6α,16β,19-trimethyl-Δ⁴-10α-pregnene-11β,17α,21-triol-3,20-dione.
213. 9α-fluoro-6α-methyl-19-ethyl-16α,17α-isopropylidenedioxy-Δ⁴-10α-pregnene-11β,21-diol-3,20-dione.
214. 9α-fluoro-6α-methyl-19-ethyl-Δ⁴-10α-pregnene-11β,17α,21-triol-3,20-dione.
215. 9α-fluoro-6α,16α-dimethyl-19-ethyl-Δ⁴-10α-pregnene-11β,17α,21-triol-3,20-dione.
216. 9α-fluoro-6α,16β-dimethyl-19-ethyl-Δ⁴-10α-pregnene-11β,17α,21-triol-3,20-dione.
217. 6α-chloro-9α-fluoro-19-methyl-Δ⁴-10α-pregnene-11β,17α,21-triol-3,20-dione 21-acetate.
218. 6α-chloro-9α-fluoro-19-methyl-16α,17α-isopropylidenedioxy-Δ⁴-10α-pregnene-11β,21-diol-3,20-dione 21-acetate.
219. 6α-chloro-9α-fluoro-16α,19-dimethyl-Δ⁴-10α-pregnene-11β,17α,21-triol-3,20-dione 21-acetate.
220. 6α-chloro-9α-fluoro-16β,19-dimethyl-Δ⁴-10α-pregnene-11β,17α,21-triol-3,20-dione 21-acetate.
221. 6α-chloro-9α-fluoro-19-ethyl-16α,17α-isopropylidenedioxy-Δ⁴-10α-pregnene-11β,21-diol-3,20-dione 21-acetate.
222. 6α-chloro-9α-fluoro-19-ethyl-Δ⁴-10α-pregnene-11β,17α,21-triol-3,20-dione 21-acetate.
223. 6α-chloro-9α-fluoro-16α-methyl-19-ethyl-Δ⁴-10α-pregnene-11β,17α,21-triol-3,20-dione 21-acetate.
224. 6α-chloro-9α-fluoro-16β-methyl-19-ethyl-Δ⁴-10α-pregnene-11β,17α,21-triol-3,20-dione 21-acetate.
225. 6α,9α-difluoro-19-methyl-Δ⁴-10α-pregnene-11β,17α,21-triol-3,20-dione 21-acetate.
226. 6α,9α-difluoro-19-methyl-16α,17α-isopropylidenedioxy-Δ⁴-10α-pregnene-11β,21-diol-3,20-dione 21-acetate.
227. 6α,9α-difluoro-16α,19-dimethyl-Δ⁴-10α-pregnene-11β,17α,21-triol-3,20-dione 21-acetate.
228. 6α,9α-difluoro-16β,19-dimethyl-Δ⁴-10α-pregnene-11β,17α,21-triol-3,20-dione 21-acetate.
229. 6α,9α-difluoro-19-ethyl-16α,17α-isopropylidenedioxy-Δ⁴-10α-pregnene-11β,21-diol-3,20-dione 21-acetate.
230. 6α,9α-difluoro-19-ethyl-Δ⁴-10α-pregnene-11β,17α,21-triol-3,20-dione 21-acetate.
231. 6α,9α-difluoro-16α-methyl-19-ethyl-Δ⁴-10α-pregnene-11β,17α,21-triol-3,20-dione 21-acetate.
232. 6α,9α-difluoro-16β-methyl-19-ethyl-Δ⁴-10α-pregnene-11β,17α,21-triol-3,20-dione 21-acetate.

Cpd. No.:
233. 6β-chloro-9α-fluoro-19-methyl-Δ⁴-10α-pregnene-11β,17α,21-triol-3,20-dione 21-acetate.
234. 6β-chloro-9α-fluoro-19-methyl-16α,17α-isopropylidenedioxy-Δ⁴-10α-pregnene-11β,21-diol-3,20-dione 21-acetate.
235. 6β-chloro-9α-fluoro-16α,19-dimethyl-Δ⁴-10α-pregnene-11β,17α,21-triol-3,20-dione 21-acetate.
236. 6β-chloro-9α-fluoro-16β,19-dimethyl-Δ⁴-10α-pregnene-11β,17α,21-triol-3,20-dione 21-acetate.
237. 6β-chloro-9α-fluoro-19-ethyl-16α,17α-isopropylidenedioxy-Δ⁴-10α-pregnene-11β,21-diol-3,20-dione 21-acetate.
238. 6β-chloro-9α-fluoro-19-ethyl-Δ⁴-10α-pregnene-11β,17α,21-triol-3,20-dione 21-acetate.
239. 6β-chloro-9α-fluoro-16α-methyl-19-ethyl-Δ⁴-10α-pregnene-11β,17α,21-triol-3,20-dione 21-acetate.
240. 6β-chloro-9α-fluoro-16β-methyl-19-ethyl-Δ⁴-10α-pregnene-11β,17α,21-triol-3,20-dione 21-acetate.
241. 6β,9α-difluoro-19-methyl-Δ⁴-10α-pregnene-11β,17α,21-triol-3,20-dione 21-acetate.
242. 6β,9α-difluoro-19-methyl-16α,17α-isopropylidenedioxy-Δ⁴-10α-pregnene-11β,21-diol-3,20-dione-21-acetate.
243. 6β,9α-difluoro-16α,19-dimethyl-Δ⁴-10α-pregnene-11β,17α,21-triol-3,20-dione 21-acetate.
244. 6β,9α-difluoro-16β,19-dimethyl-Δ⁴-10α-pregnene-11β,17α,21-triol-3,20-dione 21-acetate.
245. 6β,9α-difluoro-19-ethyl-16α,17α-isopropylidenedioxy-Δ⁴-10α-pregnene-11β,21-diol-3,20-dione 21-acetate.
246. 6β,9α-difluoro-19-ethyl-Δ⁴-10α-pregnene-11β,17α,21-triol-3,20-dione 21-acetate.
247. 6β,9α-difluoro-16α-methyl-19-ethyl-Δ⁴-10α-pregnene-11β,17α,21-triol-3,20-dione 21-acetate.
248. 6β,9α-difluoro-16β-methyl-19-ethyl-Δ⁴-10α-pregnene-11β,17α,21-triol-3,20-dione 21-acetate.

*Example XVI*

To a solution of 4 g. of 9β,11β-oxido-19-methyl-Δ⁴-10α-pregnene-17α,21-diol-3,20-dione 21-acetate (Cpd. No. 137) in 40 cc. of anhydrous chloroform, was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 9α-chloro-19-methyl-Δ⁴-10α-pregnene-11β,17α,21-triol-3,20-dione 21-acetate (Cpd. No. 249). The compounds Nos. 138 to 192, inclusive, were treated by the same procedure, thus affording respectively:

Cpd. No.:
250. 9α-chloro-19-methyl-16α,17α-isopropylidenedioxy-Δ⁴-10α-pregnene-11β,21-diol-3,20-dione 21-acetate.
251. 9α-chloro-16α,19-dimethyl-Δ⁴-10α-pregnene-11β,17α,21-triol-3,20-dione 21-acetate.
252. 9α-chloro-16β,19-dimethyl-Δ⁴-10α-pregnene-11β,17α,21-triol-3,20-dione 21-acetate.
253. 9α-chloro-19-ethyl-16α,17α-isopropylidenedioxy-Δ⁴-10α-pregnene-11β,21-diol-3,20-dione 21-acetate.
254. 9α-chloro-19-ethyl-Δ⁴-10α-pregnene-11β,17α,21-triol-3,20-dione 21-acetate.
255. 9α-chloro-16α-methyl-19-ethyl-Δ⁴-10α-pregnene-11β,17α,21-triol-3,20-dione 21-acetate.
256. 9α-chloro-16β-methyl-19-ethyl-Δ⁴-10α-pregnene-11β,17α,21-triol-3,20-dione 21-acetate.

Cpd. No.:
257. 9α-chloro-6β,19-dimethyl-Δ⁴-10α-pregnene-11β,17α,21-triol-3,20-dione.
258. 9α-chloro-6β,19-dimethyl-16α,17α-isopropylidenedioxy-Δ⁴-10α-pregnene-11β,21-diol-3,20-dione.
259. 9α-chloro-6β,16α,19-trimethyl-Δ⁴-10α-pregnene-11β,17α,21-triol-3,20-dione.
260. 9α-chloro-6β,16β,19-trimethyl-Δ⁴-10α-pregnene-11β,17α,21-triol-3,20-dione.
261. 9α-chloro-6β-methyl-19-ethyl-16α,17α-isopropylidenedioxy-Δ⁴-10α-pregnene-11β,21-diol-3,20-dione.
262. 9α-chloro-6β-methyl-19-ethylΔ⁴-10α-pregnene-11β,17α,21-triol-3,20-dione.
263. 9α-chloro-6β,16α-dimethyl-19-ethyl-Δ⁴-10α-pregnene-11β,17α,21-triol-3,20-dione.
264. 9α-chloro-6β,16β-dimethyl-19-ethyl-Δ⁴-10α-pregnene-11β,17α,21-triol-3,20-dione.
265. 9α-chloro-6α,19-dimethyl-Δ⁴-10α-pregnene-11β,17α,21-triol-3,20-dione.
266. 9α-chloro-6α,19-dimethyl-16α,17α-isoproplyidenedioxy-Δ⁴-10α-pregnene-11β,21-diol-3,20-dione.
267. 9α-chloro-6α,16α,19-trimethyl-Δ⁴-10α-pregnene-11β,17α,21-triol-3,20-dione.
268. 9α-chloro-6α,16β,19-trimethyl-Δ⁴-10α-pregnene-11β,17α,21-triol-3,20-dione.
269. 9α-chloro-6α-methyl-19-ethyl-16α,17α-isopropylidenedioxy-Δ⁴-10α-pregnene-11β,21-diol-3,20-dione.
270. 9α-chloro-6α-methyl-19-ethyl-Δ⁴-10α-pregnene-11β,17α,21-triol-3,20-dione.
271. 9α-chloro-6α,16α-dimethyl-19-ethyl-Δ⁴-10α-pregnene-11β,17α,21-triol-3,20-dione.
272. 9α-chloro-6α,16β-dimethyl-19-ethyl-Δ⁴-10α-pregnene-11β,17α,21-triol-3,20-dione.
273. 6α,9α-dichloro-19-methyl-Δ⁴-10α-pregnene-11β,17α,21-triol-3,20-dione 21-acetate.
274. 6α,9α-dichloro-19-methyl-16α,17α-isopropylidenedioxy-Δ⁴-10α-pregnene-11β,21-diol-3,20-dione 21-acetate.
275. 6α,9α-dichloro-16α,19-dimethyl-Δ⁴-10α-pregnene-11β,17α,21-triol-3,20-dione, 21-acetate.
276. 6α,9α-dichloro-16β,19-dimethyl-Δ⁴-10α-pregnene-11β,17α,21-triol-3,20-dione 21-acetate.
277. 6α,9α-dichloro-19-ethyl-16α,17α-isopropylidenedioxy-Δ⁴-10α-pregnene-11β,21-diol-3,20-dione 21-acetate.
278. 6α,9α-dichloro-19-ethyl-Δ⁴-10α-pregnene-11β,17α,21-triol-3,20-dione 21-acetate.
279. 6α,9α-dichloro-16α-methyl-19-ethyl-Δ⁴-10α-pregnene-11β,17α,21-triol-3,20-dione 21-acetate.
280. 6α,9α-dichloro-16β-methyl-19-ethyl-Δ⁴-10α-pregnene-11β,17α,21-triol-3,20-dione 21-acetate.
281. 6α-fluoro-9α-chloro-19-methyl-Δ⁴-10α-pregnene-11β,17α,21-triol-3,20-dione 21-acetate.
282. 6α-fluoro-9α-chloro-19-methyl-16α,17α-isopropylidenedioxy-Δ⁴-10α-pregnene-11β,21-diol-3,20-dione 21-acetate.
283. 6α-fluoro-9α-chloro-16α,19-dimethyl-Δ⁴-10α-pregnene-11β,17α,21-triol-3,20-dione 21-acetate.
284. 6α-fluoro-9α-chloro-16β,19-dimethyl-Δ⁴-10α-pregnene-11β,17α,21-triol-3,20-dione 21-acetate.
285. 6α-fluoro-9α-chloro-19-ethyl-16α,17α-isopropylidenedioxy-Δ⁴-10α-pregnene-11β,21-diol-3,20-dione 21-acetate.
286. 6α-fluoro-9α-chloro-19-ethyl-Δ⁴-10α-pregnene-11β,17α,21-triol-3,20-dione 21-acetate.
287. 6α-fluoro-9α-chloro-16α-methyl-19-ethyl-Δ⁴-10α-pregnene-11β,17α,21-triol-3,20-dione 21-acetate.
288. 6α-fluoro-9α-chloro-16β-methyl-19-ethyl-Δ⁴-10α-pregnene-11β,17α,21-triol-3,20-dione 21-acetate.
289. 6β,9α-dichloro-19-methyl-Δ⁴-10α-pregnene-11β,17α,21-triol-3,20-dione 21-acetate.
290. 6β,9α-dichloro-19-methyl-16α,17α-isopropylidenedioxy-Δ⁴-10α-pregnene-11β,21-diol-3,20-dione 21-acetate.
291. 6β,9α-dichloro-16α,19-dimethyl-Δ⁴-10α-pregnene-11β,17α,21-triol-3,20-dione 21-acetate.
292. 6β,9α-dichloro-16β,19-dimethyl-Δ⁴-10α-pregnene-11β,17α,21-triol-3,20-dione 21-acetate.
293. 6β,9α-dichloro-19-ethyl-16α,17α-isopropylidenedioxy-Δ⁴-10α-pregnene-11β,21-diol-3,20-dione 21-acetate.
294. 6β,9α-dichloro-19-ethyl-Δ⁴-10α-pregnene-11β,17α,21-triol-3,20-dione 21-acetate.
294. 6β,9α-dichloro-16α-methyl-19-ethyl-Δ⁴-10α-pregnene-11β,17α,21-triol-3,20-dione 21-acetate.
296. 6β,9α-dichloro-16β-methyl-19-ethyl-Δ⁴-10α-pregnene-11β,17α,21-triol-3,20-dione 21-acetate.
297. 6β-fluoro-9α-chloro-19-methyl-Δ⁴-10α-pregnene-11β,17α,21-triol-3,20-dione 21-acetate.
298. 6β-fluoro-9α-chloro-19-methyl-16α,17α-isopropylidenedioxy-Δ⁴-10α-pregnene-11β,21-diol-3,20-dione 21-acetate.
299. 6β-fluoro-9α-chloro-16α,19-dimethyl-Δ⁴-10α-pregnene-11β,17α,21-triol-3,20-dione 21-acetate.
300. 6β-fluoro-9α-chloro-16β,19-dimethyl-Δ⁴-10α-pregnene-11β,17α,21-triol-3,20-dione 21-acetate.
301. 6β-fluoro-9α-chloro-19-ethyl-16α,17α-isopropylidenedioxy-Δ⁴-10α-pregnene-11β,21-diol-3,20-dione 21-acetate.
302. 6β-fluoro-9α-chloro-19-ethyl-Δ⁴-10α-pregnene-11β,17α,21-triol-3,20-dione 21-acetate.
303. 6β-fluoro-9α-chloro-16α-methyl-19-ethyl-Δ⁴-10α-pregnene-11β,17α,21-triol-3,20-dione 21-acetate.
304. 6β-fluoro-9α-chloro-16β-methyl-19-ethyl-Δ⁴-10α-pregnene-11β,17α,21-triol-3,20-dione 21-acetate.

*Example XVII*

A solution of 1 g. of 19-methyl-Δ⁴-10α-pregnene-11β,17α,21-triol-3,20-dione 21-acetate (Cpd. No. 81), in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 19-methyl-Δ⁴-10α-pregnene-17α,21-triol-3,11,20-trione 21-acetate (Cpd. No. 305).

The compounds Nos. 82 to 88, inclusive, were treated by the above procedure, thus affording respectively:

Cpd. No.:
306. 19-methyl-16α,17α-isopropylidenedioxy-Δ⁴-10α-pregnen-21-ol-3,11,20-trione acetate.
307. 16α,19-dimethyl-Δ⁴-10α-pregnene-17α,21-diol-3,11,20-trione 21-acetate.
308. 16β,19-dimethyl-Δ⁴-10α-pregnene-17α,21-diol-3,11,20-trione 21-acetate.
309. 19-ethyl-16α,17α-isopropylidenedioxy-Δ⁴-10α-pregnen-21-ol-3,11,20-trione acetate.
310. 19-ethyl-Δ⁴-10α-pregnene-17α,21-diol-3,11,20-trione 21-acetate.

Cpd. No.:
311. 16α-methyl-19-ethyl-Δ⁴-10α-pregnene-17α,21-diol-3,11,20-trione 21-acetate.
312. 16β-methyl-19-ethyl-Δ⁴-10α-pregnene-17α,21-diol-3,11,20-trione 21-acetate.

*Example XVIII*

The compounds Nos. 105 to 136, inclusive, were treated following the procedure described in Example XVII, thus affording the corresponding 3,11,20-trione derivatives.

*Example XIX*

The compounds Nos. 193 to 200, inclusive, Nos. 217 to 256, inclusive and Nos. 273 to 304, inclusive, were treated in accordance with Example XVII, thus yielding the corresponding 3,11,20-trione derivatives.

A mixture of 1 g. of 19-methyl-Δ⁴-10α-pregnene-11β,17α,21-triol-3,20-dione 21-acetate (Cpd. No. 81) 2 g. of chloranil and 50 cc. of ter-butanol was refluxed for 8 hours. The mixture was cooled, the excess of chloranil filtered off and washed with ethyl acetate and the organic extracts washed with a cold aqueous solution of 10% sodium hydroxide until the washings were colorless. It was then dried over anhydrous sodium sulfate and evaporated to dryness. Recrystallization from methylene chloride-ether, after decolorization with 2 g. of alumina, gave 19-methyl-Δ⁴,⁶-10α-pregnadiene-11β,17α,21 - triol - 3,20-dione 21-acetate (Cpd. No. 313).

*Example XX*

Following the same procedure disclosed in Example XIX, there were treated the compounds Nos. 82 to 88, inclusive, affording respectively:

Cpd. No.:
314. 19-methyl-16α,17α-isopropylidenedioxy-Δ⁴,⁶-10α-pregnadiene-11β,21-diol-3,20-dione 21-acetate.
315. 16α,19-dimethyl-Δ⁴,⁶-10α-pregnadiene-11β,17α,21-triol-3,20-dione 21-acetate.
316. 16β,19-dimethyl-Δ⁴,⁶-10α-pregnadiene-11β,17α,21-triol-3,20-dione 21-acetate.
317. 19-ethyl-16α,17α-isopropylidenedioxy-Δ⁴,⁶-10α-pregnadiene-11β,21-diol-3,20-dione 21-acetate.
318. 19-ethyl-Δ⁴,⁶-10α-pregnadiene-11β,17α,21-triol-3,20-dione 21-acetate.
319. 16α-methyl-19-ethyl-Δ⁴,⁶-10α-pregnadiene-11β,17α,21-triol-3,20-dione 21-acetate.
320. 16β-methyl-19-ethyl-Δ⁴,⁶-10α-pregnadiene-11β,17α,21-triol-3,20-dione 21-acetate.

*Example XXI*

The compounds Nos. 305 to 312, inclusive, were treated in accordance with the foregoing example, thus yielding respectively:

Cpd. No.:
321. 19-methyl-Δ⁴,⁶-10α-pregnadiene-17α,21-diol-3,11,20-trione 21-acetate.
322. 19-methyl-16α,17α-isopropylidenedioxy-Δ⁴,⁶-10α-pregnadien-21-ol-3,11,20-trione acetate.
323. 16α,19-dimethyl-Δ⁴,⁶-10α-pregnadiene-17α,21-diol-3,11,20-trione 21-acetate.
324. 16β,19-dimethyl-Δ⁴,⁶-10α-pregnadiene-17α,diol-3,11,20-trione 21-acetate.
325. 19-ethyl-16α,17α-isopropylidenedioxy-Δ⁴,⁶-10α-pregnadien-21-ol-3,11,20-trione acetate.
326. 19-ethyl-Δ⁴,⁶-10α-pregnadiene-17α,21-diol-3,11,20-trione 21-acetate.
327. 16α-methyl-19-ethyl-Δ⁴,⁶-10α-pregnadiene-17α,21-diol-3,11,20-trione 21-acetate.
328. 16β-methyl-19-ethyl-Δ⁴,⁶-10α-pregnadiene-17α,21-diol-3,11,20-trione 21-acetate.

*Example XXII*

The compounds Nos. 89 to 136, inclusive, and Nos. 193 to 304, inclusive, were treated following the procedure described in Example XIX, thus affording the corresponding Δ⁴,⁶-derivatives.

*Example XXIII*

A mixture of 500 mg. of 19-methyl-Δ⁴-10α-pregnene-11β,17α,21-triol-3,20-dione 21-acetate (Cpd. No. 81) 10 cc. of dioxane and 350 mg. of 2,3-dichloro-5,6-dicyano-1,4-benzoquinone was refluxed for 10 hours. It was then cooled, the 2,3-dichloro-5,6-dicyano - 1,4 - benzohydroquinone formed during the reaction filtered off, and the filtrate evaporated to dryness. The residue was dissolved in acetone and filtered through 10 g. of alumina. Crystallization from acetone-hexane gave 19-methyl-Δ¹,⁴-10α-pregnadiene-11β,17α,21-triol-3,20-dione 21-acetate (Cpd. No. 329).

Following the same procedure, there were treated the compounds Nos. 82 to 88, inclusive, affording respectively:

Cpd. No.:
330. 19-methyl-16α - 17α - isopropylidenedioxy-Δ¹,⁴-10α-pregnadiene-11β,21-diol-3,20-dione 21-acetate.
331. 16α,19-dimethyl-Δ¹,⁴-10α-pregnadiene-11β,17α,21-triol-3,20-dione 21-acetate.
332. 16β,19-dimethyl-Δ¹,⁴-10α-pregnadiene-11β,17α,21-triol-3,20-dione 21-acetate.
333. 19-ethyl-16α,17α-isopropylidenedioxy-Δ¹,⁴-10α-pregnadiene-11β,21-diol-3,20-dione 21-acetate.
334. 19-ethyl-Δ¹,⁴-10α-pregnadiene-11β,17α,21-triol-3,20-dione 21-acetate.
335. 16α-methyl-19-ethyl-Δ¹,⁴-10α-pregnadiene-11β,17α,21-triol-3,20-dione 21-acetate.
336. 16β-methyl-19-ethyl-Δ¹,⁴-10α-pregnadiene-11β,17α,21-triol-3,20-dione 21-acetate.

*Example XXIV*

The compounds Nos. 305 to 312, inclusive, were treated in accordance with the foregoing example, thus yielding respectively:

Cpd. No.:
337. 19-methyl-Δ¹,⁴-10α-pregnadiene-17α,21-diol-3,11,20-trione 21-acetate.
338. 19-methyl-16α,17α-isopropylidenedioxy-Δ¹,⁴-10α-pregnadien-21-ol-3,11,20-trione acetate.
339. 16α,19-dimethyl-Δ¹,⁴-10α-pregnadiene-17α,21-diol-3,11,20-trione 21-acetate.
340. 16β,19-dimethyl-Δ¹,⁴-10α-pregnadiene-17α,21-diol-3,11,20-trione 21-acetate.
341. 19-ethyl-16α,17α-isopropylidenedioxy-Δ¹,⁴-10α-pregnadien-21-ol-3,11,20-trione acetate.
342. 19-ethyl-Δ¹,⁴-10α-pregnadiene-17α,21-diol-3,11,20-trione 21-acetate.
343. 16α-methyl-19-ethyl-Δ¹,⁴-10α-pregnadiene-17α,21-diol-3,11,20-trione 21-acetate.
344. 16β-methyl-19-ethyl-Δ¹,⁴-10α-pregnadiene-17α,21-diol-3,11,20-trione 21-acetate.

*Example XXV*

The compounds Nos. 89 to 136, inclusive, and Nos. 193 to 304, inclusive, were treated following the procedure described in Example XXIII, thus affording the corresponding Δ¹,⁴-derivatives.

*Example XXVI*

The compounds Nos. 313 to 328, inclusive, were treated in accordance with Example XXIII, thus furnishing respectively:

Cpd. No.:
345. 19-methyl-Δ¹,⁴,⁶-10α-pregnatriene-11β,17α,21-triol-3,20-dione 21-acetate.

Cpd. No.:
346. 19-methyl-16α,17α-isopropylidenedioxy-Δ$^{1,4,6}$-10α-pregnatriene-11β,21-diol-3,20-dione 21-acetate.
347. 16α,19-dimethyl-Δ$^{1,4,6}$-10α-pregnatriene-11β,17α,21-triol-3,20-dione 21-acetate.
348. 16β,19-dimethyl-Δ$^{1,4,6}$-10α-pregnatriene-11β,17α,21-triol-3,20-dione 21-acetate.
349. 19-ethyl-16α,17α-isopropylidenedioxy-Δ$^{1,4,6}$-10α-pregnatriene-11β,21-diol-3,20-dione 21-acetate.
350. 19-ethyl-Δ$^{1,4,6}$-10α-pregnatriene-11β,17α,21-triol-3,20-dione 21-acetate.
351. 16α-methyl-19-ethyl-Δ$^{1,4,6}$-10α-pregnatriene-11β,17α,21-triol-3,20-dione 21-acetate.
352. 16β-methyl-19-ethyl-Δ$^{1,4,6}$-10α-pregnatriene-11β,17α,21-triol-3,20-dione 21-acetate.
353. 19-methyl-Δ$^{1,4,6}$-10α-pregnatriene-17α,21-diol-3,11,20-trione 21-acetate.
354. 19-methyl-16α,17α-isopropylidenedioxy-Δ$^{1,4,6}$-10α-pregnatrien-21-ol-3,11,20-trione acetate.
355. 16α,19-dimethyl-Δ$^{1,4,6}$-10α-pregnatriene-17α,21-diol-3,11,20-trione 21-acetate.
356. 16β,19-dimethyl-Δ$^{1,4,6}$-10α-pregnatriene-17α,21-diol-3,11,20-trione 21-acetate.
357. 19-ethyl-16α,17α-isopropylidenedioxy-Δ$^{1,4,6}$-10α-pregnatrien-21-ol-3,11,20-trione acetate.
358. 19-ethyl-Δ$^{1,4,6}$-10α-pregnatriene-17α,21-diol-3,11,20-trione 21-acetate.
359. 16α-methyl-19-ethyl-Δ$^{1,4,6}$-10α-pregnatriene-17α,21-diol-3,11,20-trione 21-acetate.
360. 16β-methyl-19-ethyl-Δ$^{1,4,6}$-10α-pregnatriene-17α,21-diol-3,11,20-trione 21-acetate.

*Example XXVII*

The final compounds of Example XXII were treated in accordance with Example XXIII thus affording the corresponding Δ$^{1,4,6}$-10α-pregnatriene derivatives.

*Example XXVIII*

2 g. of 19-methyl-Δ$^4$-10α-pregnene-11β,17α,21-triol-3,20-dione 21-acetate (Cpd. No. 81) dissolved in 50 cc. of methanol and treated with 5 cc. of a 4% aqueous solution of potassium hydroxide; the reacton mixture was stirred for 1 hour under an atmosphere of nitrogen at 0° C.; the mixture was neutralized with acetic and the methanol distilled under reduced pressure. The residue was triturated with water and the solid collected, washed with water, dried and recrystallized from ethyl acetate-methanol, thus producing 19-methyl-Δ$^4$-10α-pregnene-11β,17α,21-triol-3,20-dione (Cpd. No. 361).

Following the same procedure, there were treated compounds Nos. 82 to 88, inclusive, thus yielding respectively:

Cpd. No.:
362. 19-methyl-16α,17α-isopropylidenedioxy-Δ$^4$-10α-pregnene-11β,21-diol-3,20-dione.
363. 16α,19-dimethyl-Δ$^4$-10α-pregnene-11β,17α,21-triol-3,20-dione.
364. 16β,19-dimethyl-Δ$^4$-10α-pregnene-11β,17α,21-triol-3,20-dione.
365. 19-ethyl-16α,17α-isopropylidenedioxy-Δ$^4$-10α-pregnene-11β,21-diol-3,20-dione.
366. 19-ethyl-Δ$^4$-10α-pregnene-11β,17α,21-triol-3,20-dione.
367. 16α-methyl-19-ethyl-Δ$^4$-10α-pregnene-11β,17α,21-triol-3,20-dione.
368. 16β-methyl-19-ethyl-Δ$^4$-10α-pregnene-11β,17α,21-triol-3,20-dione.

*Example XXIX*

The compounds Nos. 305 to 312, inclusive, were treated following the procedure of Example XXVIII, thus affording respectively:

Cpd. No.:
369. 19-methyl-Δ$^4$-10α-pregnene-17α,21-diol-3,11,20-trione.
370. 19-methyl-16α,17α-isopropylidenedioxy-Δ$^4$-10α-pregnen-21-ol-3,11,20-trione.
371. 16α,19-dimethyl-Δ$^4$-10α-pregnene-17α,21-diol-3,11,20-trione.
372. 16β,19-dimethyl-Δ$^4$-10α-pregnene-17α,21-diol-3,11,20-trione.
373. 19-ethyl-16α,17α-isopropylidenedioxy-Δ$^4$-10α-pregnen-21-ol-3,11,20-trione.
374. 19-ethyl-Δ$^4$-10α-pregnene-17α,21-diol-3,11,20-trione.
375. 16α-methyl-19-ethyl-Δ$^4$-10α-pregnene-17α,21-diol-3,11,20-trione.
376. 16β-methyl-19-ethyl-Δ$^4$-10α-pregnene-17α,21-diol-3,11,20-trione.

*Example XXX*

The compounds Nos. 105 to 136, inclusive, Nos. 193 to 200, inclusive, Nos. 217 to 256, inclusive and Nos. 273 to 304, inclusive, were treated in accordance with Example XXVIII, thus producing the corresponding 21-free alcohols.

*Example XXXI*

The compounds Nos. 313 to 360, inclusive, were treated following the procedure described in Example XXVIII thus yielding respectively:

Cpd. No.:
377. 19-methyl-Δ$^{4,6}$-10α-pregnadiene-11β,17α,21-triol-3,20-dione.
378. 19-methyl-16α,17α-isopropylidenedioxy-Δ$^{4,6}$-10α-pregnadiene-11β,21-diol-3,20-dione.
379. 16α,19-dimethyl-Δ$^{4,6}$-10α-pregnadiene-11β,17α,21-triol-3,20-dione.
380. 16β,19-dimethyl-Δ$^{4,6}$-10α-pregnadiene-11β,17α,21-triol-3,20-dione.
381. 19-ethyl-16α,17α-isopropylidenedioxy-Δ$^{4,6}$-10α-pregnadiene-11β,21-diol-3,20-dione.
382. 19-ethyl-Δ$^{4,6}$-10α-pregnadiene-11β,17α,21-triol-3,20-dione.
383. 16α-methyl-19-ethyl-Δ$^{4,6}$-10α-pregnadiene-11β,17α,21-triol-3,20-dione.
384. 16β-methyl-19-ethyl-Δ$^{4,6}$-10α-pregnadiene-11β,17α,21-triol-3,20-dione.
385. 19-methyl-Δ$^{4,6}$-10α-pregnadiene-17α,21-diol-3,11,20-trione.
386. 19-methyl-16α,17α-isopropylidenedioxy-Δ$^{4,6}$-10α-pregnadien-21-ol-3,11,20-trione.
387. 16α,19-dimethyl-Δ$^{4,6}$-10α-pregnadiene-17α,21-diol-3,11,20-trione.
388. 16β,19-dimethyl-Δ$^{4,6}$-10α-pregnadiene-17α,21-diol-3,11,20-trione.
389. 19-ethyl-16α,17α-isopropylidenedioxy-Δ$^{4,6}$-10α-pregnadien-21-ol-3,11,20-trione.
390. 19-ethyl-Δ$^{4,6}$-10α-pregnadiene-17α,21-diol-3,11,20-trione.
391. 16α-methyl-19-ethyl-Δ$^{4,6}$-10α-pregnadiene-17α,21-diol-3,11,20-trione.
392. 16β-methyl-19-ethyl-Δ$^{4,6}$-10α-pregnadiene-17α,21-diol-3,11,20-trione.
393. 19-methyl-Δ$^{1,4}$-10α-pregnadiene-11β,17α,21-triol-3,20-dione.
394. 19-methyl-16α,17α-isopropylidenedioxy-Δ$^{1,4}$-10α-pregnadiene-11β,21-diol-3,20-dione.
395. 16α,19-dimethyl-Δ$^{1,4}$-10α-pregnadiene-11β,17α,21-triol-3,20-dione.
396. 16β,19-dimethyl-Δ$^{1,4}$-10α-pregnadiene-11β,17α,21-triol-3,20-dione.
397. 19-ethyl-16α,17α-isopropylidenedioxy-Δ$^{1,4}$-10α-pregnadiene-11β,21-diol-3,20-dione.

Cpd. No.:
398. 19-ethyl-Δ$^{1,4}$-10α-pregnadiene-11β,17α,21-triol-3,20-dione.
399. 16α-methyl-19-ethyl-Δ$^{1,4}$-10α-pregnadiene-11β,17α,21-triol-3,20-dione.
400. 16β-methyl-19-ethyl-Δ$^{1,4}$-10α-pregnadiene-11β,17α,21-triol-3,20-dione.
401. 19-methyl-Δ$^{1,4}$-10α-pregnadiene-17α,21-diol-3,11,20-trione.
402. 19-methyl-16α,17α-isopropylidenedioxy-Δ$^{1,4}$-10α-pregnadien-21-ol-3,11,20-trione.
403. 16α,19-dimethyl-Δ$^{1,4}$-10α-pregnadiene-17α,21-diol-3,11,20-trione.
404. 16β,19-dimethyl-Δ$^{1,4}$-10α-pregnadiene-17α,21-diol-3,11,20-trione.
405. 19-ethyl-16α,17α-isopropylidenedioxy-Δ$^{1,4}$-10α-pregnadien-21-ol-3,11,20-trione.
406. 19-ethyl-Δ$^{1,4}$-10α-pregnadiene-17α,21-diol-3,11,20-trione.
407. 16α-methyl-19-ethyl-Δ$^{1,4}$-10α-pregnadiene-17α,1-diol-3,11,20-trione.
408. 16β-methyl-19-ethyl-Δ$^{1,4}$-10α-pregnadiene-17α,21-diol-3,11,20-trione.
409. 19-methyl-Δ$^{1,4,6}$-10α-pregnatriene-11β,17α,21-triol-3,20-dione.
410. 19-methyl-16α,17α-isopropylidenedioxy-Δ$^{1,4,6}$-10α-pregnatriene-11β,21-diol-3,20-dione.
411. 16α,19-dimethyl-Δ$^{1,4,6}$-10α-pregnatriene-11β,17α,21-triol-3,20-dione.
412. 16β,19-dimethyl-Δ$^{1,4,6}$-10α-pregnatriene-11β,17α,21-triol-3,20-dione.
413. 19-ethyl-16α,17α-isopropylidenedioxy-Δ$^{1,4,6}$-10α-pregnatriene-11β,21-diol-3,20-dione.
414. 19-ethyl-Δ$^{1,4,6}$-10α-pregnatriene-11β,17α,21-triol-3,20-dione.
415. 16α-methyl-19-ethyl-Δ$^{1,4,6}$-10α-pregnatriene-11β,17α,21-triol-3,20-dione.
416. 16β-methyl-19-ethyl-Δ$^{1,4,6}$-10α-pregnatriene-11β,17α,21-triol-3,20-dione.
417. 19-methyl-Δ$^{1,4,6}$-10α-pregnatriene-17α,21-diol-3,11,20-trione.
418. 19-methyl-16α,17α-isopropylidenedioxy-Δ$^{1,4,6}$-10α-pregnatrien-21-ol-3,11,20-trione.
419. 16α,19-dimethyl-Δ$^{1,4,6}$-10α-pregnatriene-17α,21-diol-3,11,20-trione.
420. 16β,19-dimethyl-Δ$^{1,4,6}$-10α-pregnatriene-17α,21-diol-3,11,20-trione.
421. 19-ethyl-16α,17α-isopropylidenedioxy-Δ$^{1,4,6}$-10α-pregnatrien-21-ol-3,11,20-trione.
422. 19-ethyl-Δ$^{1,4,6}$-10α-pregnatriene-17α,21-diol-3,11,20-trione.
423. 16α-methyl-19-ethyl-Δ$^{1,4,6}$-10α-pregnatriene-17α,21-diol-3,11,20-trione.
424. 16β-methyl-19-ethyl-Δ$^{1,4,6}$-10α-pregnatriene-17α,21-diol-3,11,20-trione.

*Example XXXII*

A mixture of 1 g. of 6β,19-dimethyl-Δ$^4$-10α-pregnene-11β,17α,21-triol-3,20-dione (Cpd. No. 89) 4 cc. of pyridine and 2 cc. of acetic anhydride was kept at room temperature overnight, poured into ice water, the formed precipitate was filtered, washed with water and dried. Crystallization from acetone-hexane gave the 21-acetate of 6β,19-dimethyl-Δ$^4$-10α-pregnene-11β,17α,21-triol-3,20-dione (Cpd. No. 425).

The compounds Nos. 90 to 104, inclusive, were treated by the same procedure, thus yielding the corresponding 21-acetates.

*Example XXXIII*

Upon treatment of compounds Nos. 89 to 104, inclusive, by the procedure described in Example XXXII, except that acetic anhydride was substituted by propionic anhydride and caproic anhydride, there were respectively produced the corresponding 21-propionates and 21-caproates.

*Example XXXIV*

1 g. of 19-methyl-16α,17α-isopropylidenedioxy-Δ$^4$-10α-pregnene-11β,21-diol-3,20-dione 21-acetate (Cpd. No. 82) was heated on the steam bath with 20 cc. of 60% formic acid for 1 hour, cooled, diluted with water and the precipitate was collected, washed with water, dried, and recrystallized from acetone-hexane, thus affording 19-methyl-Δ$^4$-10α-pregnene-11β,16α,17α,21-tetrol-3,20-dione 21-acetate (Cpd. No. 426).

Following the same procedure, there were treated the compounds Nos. 85, 98, 101, 106, 109, 114, and 117, thus affording respectively:

Cpd. No.:
427. 19-ethyl-Δ$^4$-10α-pregnene-11β,16α,17α,21-tetrol-3,20-dione 21-acetate.
428. 6α,19-dimethyl-Δ$^4$-10α-pregnene-11β,16α,17α,21-tetrol-3,20-dione.
429. 6α-methyl-19-ethyl-Δ$^4$-10α-pregnene-11β,16α,17α,21-tetrol-3,20-dione.
430. 6α-chloro-19-methyl-Δ$^4$-10α-pregnene-11β,16α,17α,21-tetrol-3,20-dione 21-acetate.
431. 6α-chloro-19-ethyl-Δ$^4$-10α-pregnene-11β,16α,17α,21-tetrol-3,20-dione 21-acetate.
432. 6α-fluoro-19-methyl-Δ$^4$-10α-pregnene-11β,16α,17α,21-tetrol-3,20-dione 21-acetate.
433. 6α-fluoro-19-ethyl-Δ$^4$-10α-pregnene-11β,16α,17α,21-tetrol-3,20-dione 21-acetate.

*Example XXXV*

The compounds Nos. 194, 197, 210, 213, 218, and 221, were treated following the procedure described in Example XXXIV, thus affording respectively:

Cpd. No.:
434. 9α-fluoro-19-methyl-Δ$^4$-10α-pregnene-11β,16α,17α,21-tetrol-3,20-dione 21-acetate.
435. 9α-fluoro-19-ethyl-Δ$^4$-10α-pregnene-11β,16α,17α,21-tetrol-3,20-dione 21-acetate.
436. 9α-fluoro-6α,19-dimethyl-Δ$^4$-10α-pregnene-11β,16α,17α,21-tetrol-3,20-dione.
437. 9α-fluoro-6α-methyl-19-ethyl-Δ$^4$-10α-pregnene-11β,16α,17α,21-tetrol-3,20-dione.
438. 6α-chloro-9α-fluoro-19-ethyl-Δ$^4$-10α-pregnene-11β,16α,17α,21-tetrol-3,20-dione 21-acetate.
439. 6α-chloro-9α-fluoro-19-ethyl-Δ$^4$-10α-pregnene-11β,16α,17α,21-tetrol-3,20-dione 21-acetate.

*Example XXXVI*

The compounds Nos. 426, 427, 430, 431, 432 and 433, were treated following the procedure of Example XXVIII, thus affording respectively:

Cpd. No.:
440. 19-methyl-Δ$^4$-10α-pregnene-11β,16α,17α,21-tetrol-3,20-dione.
441. 19-ethyl-Δ$^4$-10α-pregnene-11β,16α,17α,21-tetrol-3,20-dione.
442. 6α-chloro-19-methyl-Δ$^4$-10α-pregnene-11β,16α,17α,21-tetrol-3,20-dione.
443. 6α-chloro-19-ethyl-Δ$^4$-10α-pregnene-11β,16α,17α,21-tetrol-3,20-dione.
444. 6α-fluoro-19-methyl-Δ$^4$-10α-pregnene-11β,16α,17α,21-tetrol-3,20-dione.
445. 6α-fluoro-19-ethyl-Δ$^4$-10α-pregnene-11β,16α,17α,21-tetrol-3,20-dione.

*Example XXXVII*

The compounds Nos. 426 to 433, inclusive, were treated in accordance with the method of Example XXXII, thus affording respectively:

Cpd. No.:
446. 19-methyl-Δ$^4$-10α-pregnene-11β,16α,17α,21-tetrol-3,20-dione 16,21-diacetate.
447. 9-ethyl-Δ$^4$-10α-pregnene-11β,16α,17α,21-tetrol-3,20-dione 16,21-diacetate.

Cpd. No.:
448. 6α,19-dimethyl-Δ⁴-10α-pregnene - 11β,16α,17α,21-tetrol-3,20-dione 16,21-diacetate.
449. 6α-methyl-19-ethyl-Δ⁴-10α-pregnene - 11β,16α,17α,21-tetrol-3,10-dione 16,21-diacetate.
450. 6α-chloro-19-methyl-Δ⁴-10α-pregnene - 11β,16α,17α,21-tetrol-3,20-dione 16,21-diacetate.
451. 6α-chloro-19-ethyl-Δ⁴-10α-pregnene - 11β,16α,17α,21-tetrol-3,20-dione 16,21-diacetate.
452. 6α-fluoro-19-methyl-Δ⁴-10α-pregnene - 11β,16α,17α,21-tetrol-3,20-dione 16,21-diacetate.
453. 6α-fluoro-19-ethyl-Δ⁴-10α - pregnene - 11β,16α,17α,21-tetrol-3,20-dione 16,21-diacetate.

*Example XXXVIII*

A solution of 500 mg. of 19-methyl-Δ⁴-10α-pregnene-11β,16α,17α,21-tetrol-3,20-dione 21-acetate (Cpd. No. 426) in 20 cc. of chloroform was treated with 1 g. of acetaldehyde and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α-ethylidenedioxy-19-methyl-Δ⁴-10α-pregnene-11β,21-diol-3,20-dione 21-acetate (Cpd. No. 454).

The compounds Nos. 427 to 445, inclusive, were treated according to the above procedure, yielding the corresponding 16α,17α-ethylidenedioxy compounds.

*Example XXXIX*

A mixture of 1 g. of compound No. 426, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded 19-methyl-Δ⁴-10α-pregnene-11β,16α,17α,21-tetrol-3,20-dione 21-acetate 16,17-acetophenonide (Cpd. No. 455).

The compounds Nos. 427 to 445, inclusive, were treated according to the above procedure, thus yielding the corresponding 16,17-acetophenonides.

*Example XL*

Into a solution of 3 g. of compound No. 121 in 150 cc. of glacial acetic acid was passed a slow stream of dry hydrogen chloride for 4 hours, while maintaining the temperature around 15° C. The mixture was then poured into ice-water, the precipitate collected, washed with water, dried and recrystallized from acetone-hexane to give a compound identical with compound No. 105.

I claim:
1. A compound of the following formula:

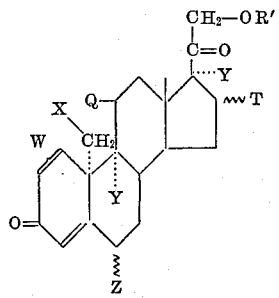

where X is a lower alkyl group; W is selected from the group consisting of double bond and a saturated linkage between C-1 and C-2; Z is a member of the group consisting of hydrogen, α-methyl, β-methyl, α-fluorine, β-fluorine, α-chlorine and β-chlorine; Q is selected from the group consisting of β-hydroxyl and keto; Y is selected from the group consisting of hydrogen, fluorine and chlorine; R is a hydroxyl group; T is a member of the group consisting of hydrogen, α-hydroxy, α-hydrocarbon carboxylic acyloxy of less than 12 carbon atoms, α-methyl and β-methyl; R and T together are the group

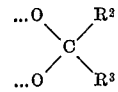

wherein R² and R³ are selected from the group consisting of hydrogen and a lower hydrocarbon residue of less than 8 carbon atoms; and R¹ is selected from the group consisting of hydrogen and a hydrocarbon carboxylic acyl group of less than 12 carbon atoms.

2. A compound of the following formula:

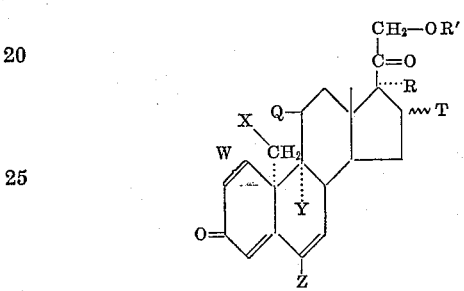

wherein X is a lower alkyl group; W is selected from the group consisting of a double bond and a saturated linkage between C-1 and C-2; Z is a member of the group consisting of hydrogen, methyl, fluorine and chlorine; Q is selected from the group consisting of β-hydroxyl and keto; Y is selected from the group consisting of hydrogen, fluorine and chlorine; R is hydroxyl group; T is a member of the group consisting of hydrogen, α-hydroxy, α-hydrocarbon carboxylic acyloxy of less than 12 carbon atoms, α-methyl and β-methyl; R and T together are the group

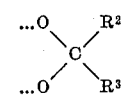

wherein R² and R³ are selected from the group consisting of hydrogen and a lower hydrocarbon residue of less than 8 carbon atoms; and R¹ is selected from the group consisting of hydrogen and a hydrocarbon carboxylic acyl group of less than 12 carbon atoms.

3. 19-methyl-Δ-⁴-10α-pregnene-11β,17α,21 - triol - 3,20-dione.
4. 19-methyl-16α,17α - isopropylidenedioxy-Δ⁴ - 10α-pregnene-11β,21-diol-3,20-dione.
5. 16α,19 - dimethyl - Δ⁴ - 10α-pregnene - 11β,17α,21-triol-3,20-dione.
6. 16β,19 - dimethyl - Δ⁴ - 10α pregnene - 11β,17α,21-triol-3,20-dione.
7. 19-ethyl-Δ⁴ - 10α-pregnene - 11β,17α-21 - triol - 3,20-dione.
8. 16α-methyl-19-ethyl - Δ⁴ - 10α-pregnene-11β,17α,21-triol-3,20-dione.
9. 16β-methyl-19-ethyl - Δ⁴ - 10α-pregnene-11β,17α,21-triol-3,20-dione.
10. 19-ethyl-16α,17α - isopropylidenedioxy-Δ⁴-10α-pregnen-11β,21-diol-3,20-dione.
11. 19-methyl-16α,17α - isopropylidenedioxy - Δ⁴ - 10α-pregnene-21-ol-3,11,20-trione.
12. 19-ethyl - 16α,17α - isopropylidenedioxy - Δ⁴ - 10α-pregnen-21-ol-3,11,20-trione.
13. 19-methyl-Δ⁴-10α - pregnene - 17α,21-diol-3,11,20-trione.
14. 16α,19-dimethyl-Δ⁴-10α - pregnene - 17α,21 - diol-3,11,20-trione.

15. 16β,19-dimethyl-Δ⁴-10α - pregnene - 17α,21 - diol-3,11,20-trione.
16. 19-ethyl-Δ⁴-10α - pregnene - 17α,21 - diol-3,11,20-trione.
17. 16α-methyl-19-ethyl-Δ⁴-10α - pregnene-17α,21-diol-3,11,20-trione.
18. 16β-methyl-19-ethyl-Δ⁴-10α-pregnene - 17α,21-diol-3,11,20-trione.
19. 6α-methyl-19-ethyl-Δ⁴-10α - pregnene - 11β,17α,21-triol-3,20-dione.
20. 6α,19-dimethyl-Δ⁴-10α-pregnene - 11β,17α,21-triol-3,20-dione.
21. 6α-fluoro-19-methyl-Δ⁴-10α-pregnene - 11β,17α,21-triol-3,20-dione.

References Cited in the file of this patent

C. Chem. Tetrahedron 3, pp. 43-48 (1958).
Mayor et al. J. Chem. Soc., pp. 2792–2800 (1960).
Mayor et al.: J. Chem. Soc., pp. 2800-2802 (1960).
Castells et al.: J. Chem. Soc. p. 2627-2639 (1960).